United States Patent [19]

Kim et al.

[11] Patent Number: 4,493,020
[45] Date of Patent: * Jan. 8, 1985

[54] MICROPROGRAMMED DIGITAL DATA PROCESSOR EMPLOYING MICROINSTRUCTION TASKING AND DYNAMIC REGISTER ALLOCATION

[75] Inventors: Dongsung R. Kim, Laguna Hills; John H. McClintock, Jr., Mission Viejo, both of Calif.

[73] Assignee: Burroughs Corporation, Detroit, Mich.

[*] Notice: The portion of the term of this patent subsequent to May 17, 2000 has been disclaimed.

[21] Appl. No.: 173,379
[22] Filed: Jul. 29, 1980

Related U.S. Application Data

[63] Continuation-in-part of Ser. No. 147,251, May 6, 1980.
[51] Int. Cl.³ .......................... G06F 9/22; G06F 9/28; G06F 9/38; G06F 9/46
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,886,523 | 5/1975 | Ferguson et al. | 364/200 |
| 4,038,643 | 7/1977 | Kim | 364/200 |
| 4,110,822 | 8/1978 | Porter et al. | 364/200 |
| 4,124,890 | 11/1978 | Vasenkov et al. | 364/200 |
| 4,149,242 | 4/1979 | Pirz | 364/200 |
| 4,155,120 | 5/1979 | Keefer et al. | 364/200 |
| 4,156,925 | 5/1979 | Tutt et al. | 364/200 |
| 4,181,935 | 1/1980 | Feeser et al. | 364/200 |
| 4,251,861 | 2/1981 | Mago | 364/200 |
| 4,305,124 | 12/1981 | Marco et al. | 364/200 |
| 4,307,445 | 12/1981 | Tredennick et al. | 364/200 |
| 4,310,880 | 1/1982 | Gehman | 364/200 |
| 4,330,823 | 5/1982 | Retter | 364/200 |
| 4,342,078 | 7/1982 | Tredennick et al. | 364/200 |

OTHER PUBLICATIONS

Ralston, A., *Encyclopedia of Computer Science*, Van Nostrand Reinhold Company, N.Y., 1976, pp. 953-957, 928-929.
Flynn, M. J., "Microprogramming-Another Look at Internal Computer Control", *Proceedings of the IEEE*, vol. 63, No. 11, Nov. 1975, pp. 1554-1567.
Rauscher, T. G. and Adams, P. M., "Microprogramming: A Tutorial and Survey of Recent Developments", *IEEE Transactions on Computers*, vol. C-29, No. 1, Jan. 1980, pp. 2-20.
Kogge, P. M., "The Microprogramming of Pipelined Processors", *Proceedings of the 4th Annual Symposium on Computer Architecture*, Mar. 1977, pp. 63-69.
Romani, F., "A Pipeline Architecture Oriented Towards Efficient Multitasking", *Euromicro*, vol. 2, No. 4, Oct. 1976, North Holland Publishing Co., Amsterdam, pp. 40-47.
Hauck, E. A. and Dent, B. A., "Burroughs' B6500/B7500 Stack Mechanism", *Proceedings of the AFIPS Spring Joint Computer Conference*, 1968, pp. 245-251.
Bulman, D. M., "Stack Computers", *Computer*, May 1977, pp. 14-16.
Bulman, D. M., "Stack Computers: An Introduction", *Computer*, May, 1977, pp. 18-28.
Blake, R. P., "Exploring a Stack Architecture", *Computer*, May 1977, pp. 30-39.
Couch, J. and Hamm, T., "Semantic Structures for Efficient Code Generation on a Stack Machine", *Computer*, 1977, May, pp. 42-48.
Duncan, F. G., "Stack Machine Development: Australia, Great Britain, and Europe", *Computer*, May 1977, pp. 50-52.

*Primary Examiner*—Mark E. Nusbaum
*Assistant Examiner*—Gary V. Harkcom
*Attorney, Agent, or Firm*—Nathan Cass; Kevin R. Peterson; David G. Rasmussen

[57] ABSTRACT

A microprogrammed data processing system is provided in which each high level instruction is performed by one or more tasks, each task being in turn performed by executing one or more task microinstructions in a microprogrammed manner. Dynamic resource allocation is provided by employing a plurality of dynamically allocatable registers whose free and use states are continuously monitored in an allocation register. The outputs of the allocation register are used as an address for a register allocation memory which is mapped so as to identify a particular group of free registers which are available for assignment for each new task in response to the allocation register address.

10 Claims, 19 Drawing Figures

OVERALL SYSTEM

FIG. 5.

| INITIATED TASK | OP | TASK MIX | TASK INPUT(S) | TASK OUTPUT(S) | TOP-OF-STACK LIST | FREE REGISTERS |
|---|---|---|---|---|---|---|
| — | — | NONE | — | — | EMPTY | R0, R1, R2, R3, R4, R5, R6, R7 |
| T1 | VALCA | T1 | — | R0 | R0 | R1, R2, R3, R4, R5, R6, R7 |
| T2 | VALCB | T1, T2 | — | R1 | R0, R1 | R2, R3, R4, R5, R6, R7 |
| T3 | ADD | T1, T2, T3 | R0, R1 | R2 | R2 | R3, R4, R5, R6, R7 |
| T4 | ONE | T1, T2, T3, T4 | — | R3 | R2, R3 | R4, R5, R6, R7 |
| T5 | VALC C | T1, T2, T3, T4, T5 | — | R4 | R2, R3, R4 | R5, R6, R7 |
| T6 | ADD | T1, T2, T3, T4, T5, T6 | R3, R4 | R5 | R2, R5 | R6, R7 |
| T7 | SUBSTRACT | T1, T2, T3, T4, T5, T6, T7 | R2, R5 | R6 | R6 | R7 |

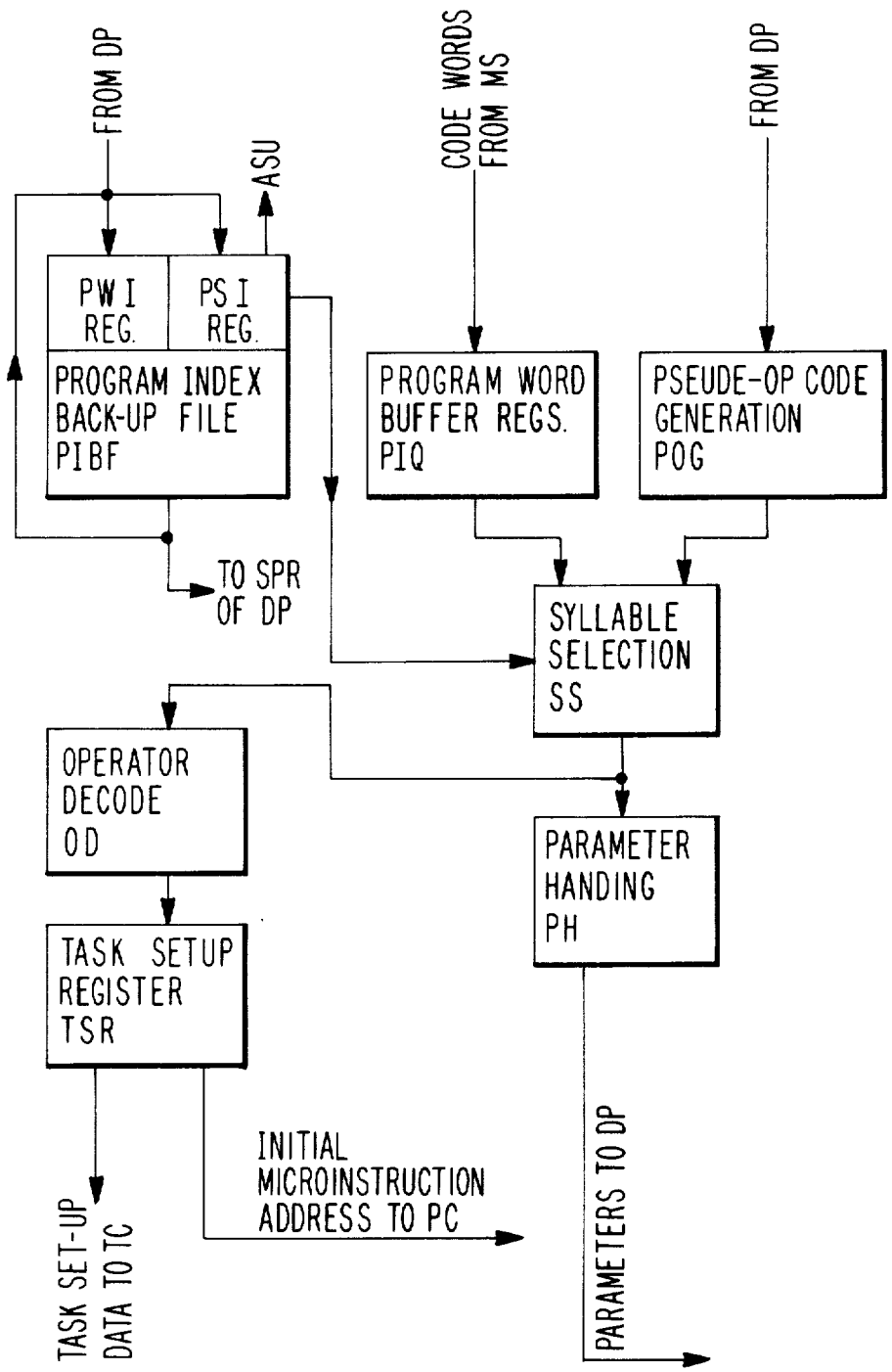
FIG. 9. PROGRAM CONTROLLER PC

FIG. 15.
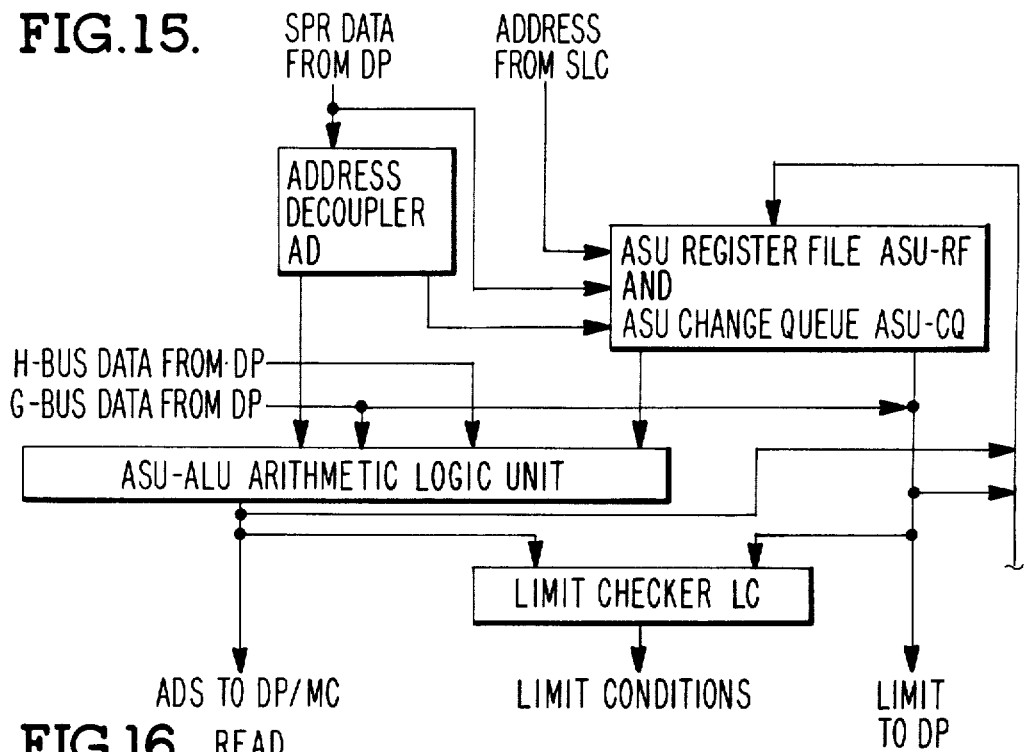
FIG. 16. READ
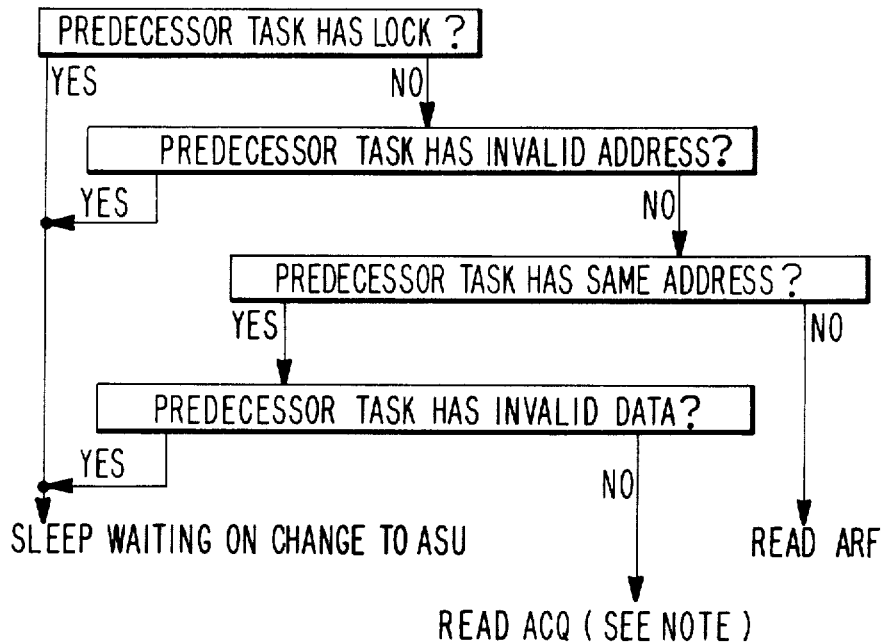

MICROPROGRAMMED DIGITAL DATA PROCESSOR EMPLOYING MICROINSTRUCTION TASKING AND DYNAMIC REGISTER ALLOCATION

CROSS REFERENCE TO RELATED PATENT APPLICATIONS

This is a continuation-in-part of patent application Ser. No. 147,251, filed May 6, 1980.

Patent application Ser. No. 147,149, filed May 6, 1980, contains subject matter related to this application.

INTRODUCTION

The present invention relates to improved means and methods for performing data processing operations in a microprogrammed electronic digital computer. More particularly, the present invention relates to approved means and methods for controlling the execution and sequencing of microinstructions in a manner such that pipelined multiprocessing is provided at a microinstruction level.

BACKGROUND OF THE INVENTION

A particular architectural concept that has allowed for more flexibility in computer design and also in computer programming has been the concept of microinstructions. Initially, a microinstruction was thought of as merely a set of control bits employed within a macroinstruction format. Such control bits were, for example, employed to provide a corrective measure during the execution of a multiplying instruction or shift instruction and the like. Gradually, as the microprogramming concept enlarged, the macroinstruction specified the particular routine to be performed, such as the addition of two operands. The execution of the macroinstruction was then accomplished through a sequence of executions of microinstructions, each of which specified the particular gates to be set thereby. Since a plurality of macroinstructions could be implemented by a finite set of microinstructions, it was then apparent that these same microinstructions could be stored in a separate storage to be addressed in a particular sequence upon the execution of different macroinstructions. It was further recognized that various sequences of microinstructions could be formulated to carry out the particular operations and separately stored in any memory. Thus, a great variety of sequences of microinstructions could be created to carry out a great variety of routines.

The concept of microinstructions or microprograms, then, became one of providing sub-instructional sets which were masked or hidden from the programmer, thus, simplifying the writing of particular programs by minimizing the number of individual specific steps that had to be called for by the programmer. Furthermore, the concept of microprogramming allows the computer designer to design a less expensive computer system that could provide a great variety of routines to the computer user without the requirement of individual functions being implemented in hard-wired circuitry.

Microprogramming may thus be broadly viewed as a technique for designing and implementing the control function of a digital computer system as sequences of control signals that are organized on a word basis and stored in a fixed or dynamically changeable control memory. Detailed examples of some known approaches to the design of microprogrammed digital computers can be found in U.S. Pat. No. 3,886,523, Ferguson et al., issued May 27, 1975, U.S. Pat. No. 4,155,120, Keefer and Kim, issued May 15, 1979, U.S. Pat. No. 4,181,935, Feeser and Gerhold, issued Jan. 1, 1980 and U.S. Pat. No. 4,038,643, Kim, issued July 26, 1977; in the book by S. S. Husson, "Microprogramming: Principles and Practices", Prentice-Hall, Inc. (1970); in the book "Foundations of Microprogramming", Argrausala, et al., Academic Press, Inc., 1976; in the article "Microprogramming—Another Look at Internal Computer Control", M. J. Flynn, I.E.E.E. Proc., Vol. 63, No. 11, November 1975, pp. 1554-1567; and in the article "Microprogramming: A Tutorial and Survey of Recent Developments", I.E.E.E. Transactions on Computers, Vol. C-29, No. 1, January, 1980.

In recent years the concept of microprogramming has been extended for use in conjunction with pipelined architectures as described, for example, in the article "The Microprogramming of Pipelined Processors", P. M. Kogge, 4th Annual Symposium on Computer Architecture, March 1977, pp. 63-69; and also in the article "A Pipeline Architecture Oriented Towards Efficient Multitasking", F. Romani, Euromicro, October 1976, Vol. 2, No. 4, North-Holland Publishing Co., Amsterdam.

The contents and teachings of the above references are to be regarded as incorporated herein.

SUMMARY OF THE PRESENT INVENTION

An important feature of the present invention is to further extend the advantages of microprogramming by providing for pipelined multiprocessing at a microinstruction level in a microprogrammed computer system.

Another feature of the present invention is to provide a microprogrammed data processing system employing pipelining and microinstruction tasking in a manner which permits advantage to be taken of both multiprocessing and multiprogramming at a microinstruction level.

A further feature of the present invention is to provide a microprogrammed data processing system which provides for dynamic resource allocation in conjunction with microinstruction tasking and pipelined multiprocessing so as to further enhance the capability and advantages derivable from microinstruction tasking.

In a preferred embodiment of the invention, a microprogrammed data processor is provided with a three-stage pipelined architecture having the capability of managing and dynamically allocating resources for up to sixteen activated tasks while concurrently providing for the execution of three dynamically selectable task microinstructions, each task being executed as a result of the performance of one or more task microinstructions. In the preferred embodiment, the three stage pipelined architecture is implemented so as to in effect provide three separate processors operating 120° out of phase with one another and sharing the same physical hardware. Each processor is capable of executing task microinstructions in any desired intermixed order regardless of the particular task to which they belong, thereby providing a multiprogramming capability for each processor. Since, in the preferred embodiment, there are in effect three separate processors having this multiprogramming capability, the added capability of multiprocessing is advantageously achieved. A task controller serves to manage and dynamically select the tasks to be executed as well as to dynamically allocate resources for activated tasks as required.

The specific nature of the invention as well as other objects, features, advantages and uses thereof will become evident from the following detailed description taken in conjunction with the accompanying drawings.

BRIEF DESCRIPTION OF THE DRAWINGS

FIG. 5 illustrates an example of how the preferred embodiment dynamically allocates resources for activated tasks in performing the calculation $(A+B)-(1+C)$.

FIG. 9 is a block diagram illustrating a preferred embodiment of the Program Controller PE of FIG. 3.

FIG. 15 is a block diagram illustrating a preferred embodiment of the Address and State Unit ASU in FIG. 3.

FIG. 16 is a flow chart illustrating the operation of the ASU Change Queue ASU-CQ in FIG. 15.

GENERAL DESCRIPTION

Figure 1:
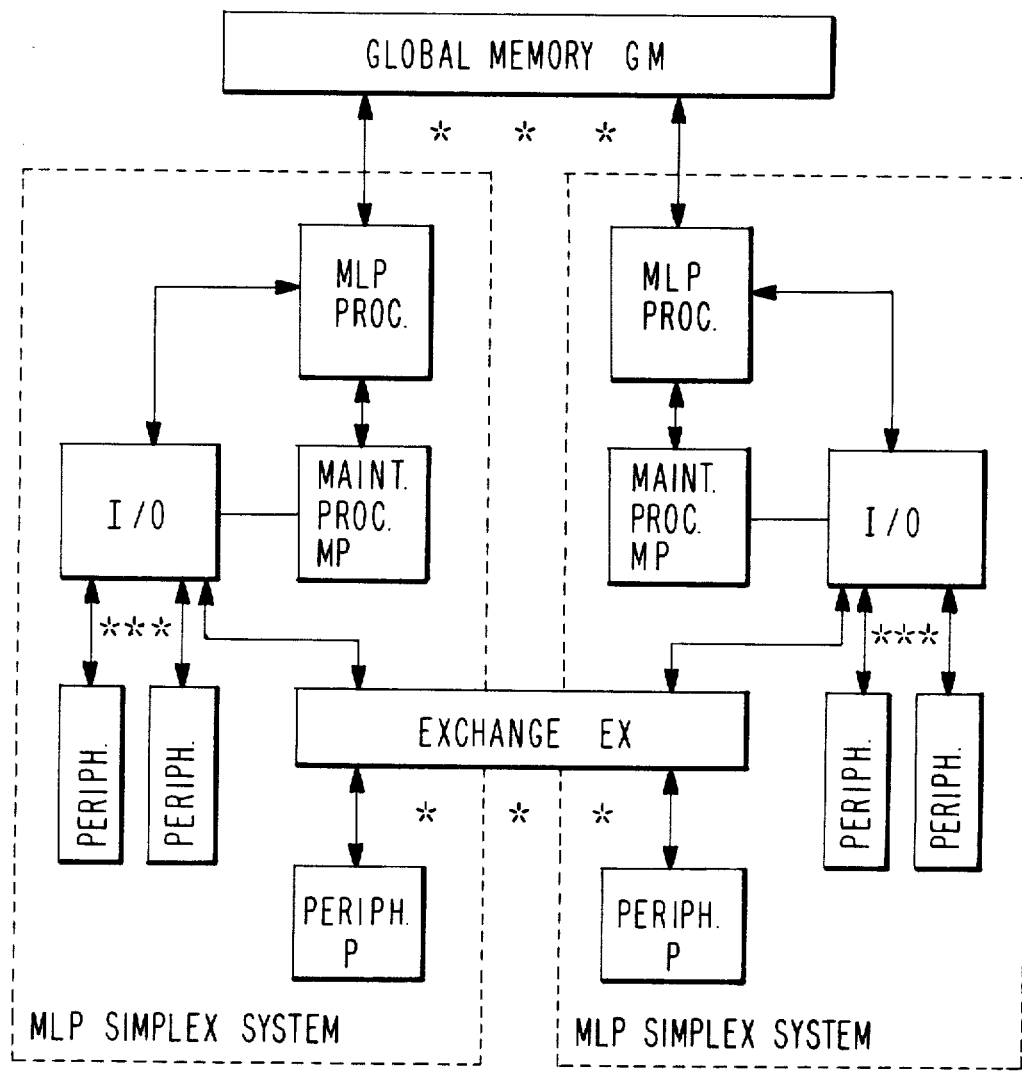
FIG. 1 is a block diagram of an overall computer system in which the present invention may be incorporated.

Overview (FIG. 1)

In a preferred embodiment, the present invention may be incorporated in an overall system comprised of one or more MLP simplex systems, such as illustrated in FIG. 1. Each simplex system typically comprises a multiple logical processor (which will hereinafter be referred to as an MLP Processor), a Maintenance Processor, and an I/O Subsystem with its associated peripherals P. These simplex systems are interconnected by an Exchange EX and a Global Memory GM which allows the system software to determine the degree of coupling between the simplex systems.

The I/O subsystem in FIG. 1 contains the user input/output devices and storage for complete sets of program and data segments. The Global Memory GM permits processor interconnection and contains program and data segments shared by the multiple processors. Each MLP processor has a local memory subsystem containing those program and data segments being processed on the MLP processor.

In the preferred embodiment, the MLP processor is an integrated hardware and firmware system which implements a high-level virtual instruction set. The instructions of this set are individually programmed by a set of firmware instructions which execute on lower-level MLP hardware. An important feature of the invention is that the MLP processor uses multiprogramming and multiprocessing techniques at the hardware (microinstruction) level to achieve a high degree of parallelism between the execution of the firmware instructions corresponding to multiple high-level instructions.

In accordance with the present invention, the MLP processor considers a sequence of the applied high-level virtual instructions as a set of tasks to be performed. It will be understood that each of these tasks can be performed by executing one or more microinstructions on a low-level processor. Some of these tasks may need to use data which is prepared by preceding tasks. However, for typical data processing applications, a substantial number of the tasks do not have such dependencies. Thus, some or all of the performance of the tasks can be overlapped. This potential for overlap is used to particular advantage by the MLP processor of the present invention which provides for both multiprogramming and multiprocessing at the hardware (microinstruction) level.

Figure 2:
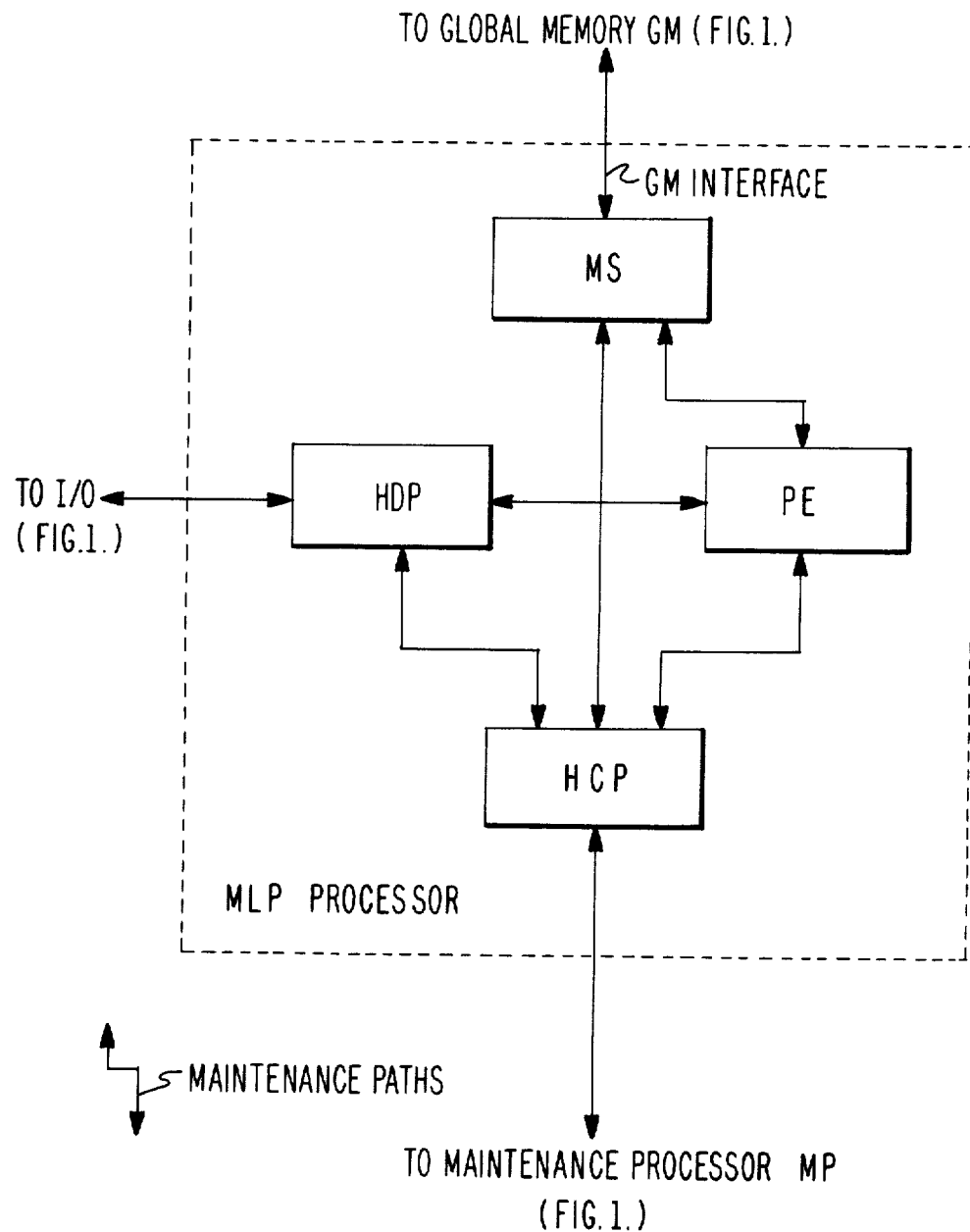
FIG. 2 is a block diagram of the MLP Processor illustrated in FIG. 1.

MLP Processor Organization (FIG. 2)

In the preferred embodiment being considered herein, the MLP processor is partitioned into hardware modules as shown in FIG. 2. The Processing Element PE contains both the basic data path and the storage for the processor microcode. The Memory Subsystem MS contains both the local memory of the processor and the processor's interface to the Global Memory GM (FIG. 1). MS also preferably contains a cache module to improve the average access time and the bandpass of the local memory. The Host Dependent Port HDP provides the processor's interface to the I/O (FIG. 1). HDP is controlled by a task initiated by microinstructions from PE as well as a request from HDP. In the preferred embodiment, this HDP task is one of the multiple tasks that may be executed concurrently with other processor tasks. The Host Console Port HCP is the processor's interface with the system port of the Maintenance Processor MP (FIG. 1) through which the maintenance and control of the processor is performed. HCP has read-write access to all components of the processor state for initialization and maintenance.

Figure 3:
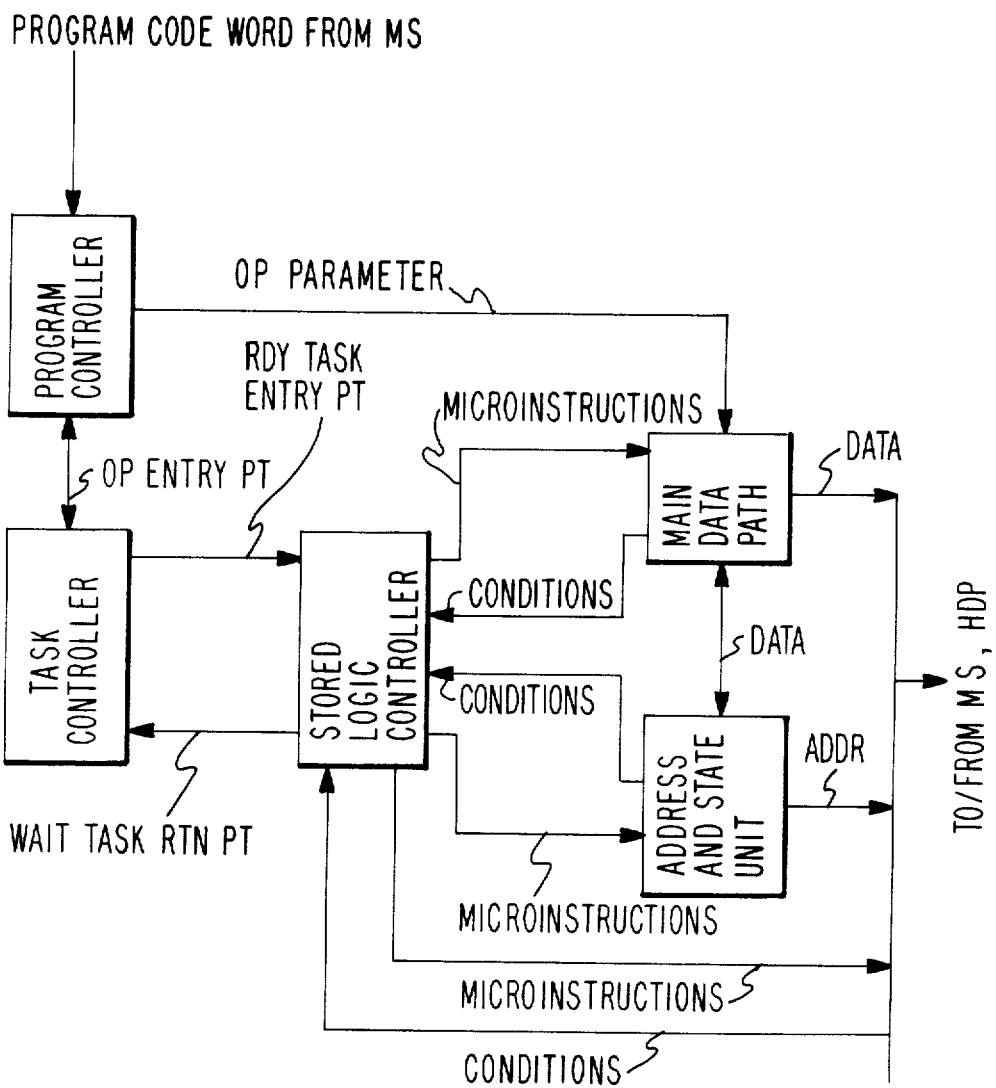
FIG. 3 is a block diagram of the Processing Element PE in FIG. 2.

Processing Element PE (FIG. 3)

As illustrated in FIG. 3, a preferred implementation of the Processing Element PE comprises five major components:

1. A Program Controller PC which parses program code words into operators and parameters and, in response to each operator, determines one or more tasks to be performed along with the resource requirements for each task.
2. A Task Controller TC which manages the tasks and controls the sequence in which tasks are performed.
3. A main Data Path DP which stores the primary data items for the tasks along with manipulation facilities for performing logical and arithmetic operations on these data items.
4. An Address and State Unit ASU which contains the storage for memory addresses along with facilities for their manipulation. ASU also stores most of the state of the high-level architecture.
5. A Stored Logic Controller SLC which stores the microcode used for executing tasks. In response to TC, DP and ASU, SLC issues microinstructions to the various components of PE in the proper sequences to perform the tasks applied thereto by TC. A task may require one or more microinstructions for its performance.

It will thus be understood that operator-level data, memory addresses and state are stored in DP and ASU, and that SLC issues microinstructions which causes these units to select the operations and data required in order to perform each task. During task execution, selected conditions are provided which flow to SLC and affect microinstruction sequencing, thereby completing the basic feedback loop in PE.

In order to achieve high performance, the preferred embodiment employs several levels of concurrency in the performance of PE operations as follows:

1. PC and TC operations (fetching, converting of operators into tasks by PC and managing and activating of tasks by TC) are concurrent with the performance of microinstructions by SLC, DP, and ASU.
2. SLC, DP and ASU operate concurrently with each other, so that during each clock cycle a microinstruction is executed by DP and ASU while a new microinstruction and state is generated by SLC.
3. SLC, DP and ASU are implemented with a multiple-stage pipeline architecture which permits multiple tasks to be concurrently performed in a manner which takes advantage of both multiprogramming and multiprocessing techniques. As is well known, multiprogramming is a technique in which the execution of multiple programs is interleaved on a single processor, whereby time intervals during which one program is waiting (i.e., not ready to execute) are used to execute portions of other programs. As is also well known, multiprocessing is a technique in which multiple processors are used to execute one or more programs.

Basic Operation of the Processor Element PE (FIG. 3)

Before considering specific inplementations of the MLP Processor, some basic operating features will first be presented.

Generation of Tasks

The generation of tasks in the Processor Element PE is performed by the Program Controller PC and the Task Controller TC. PC examines the sequence of raw words of code derived from applied high-level instructions, determines the sequence of high-level operators to be performed, and, for each of these operators, determines one or more tasks to be performed. Each task, along with its resource requirements, is forwarded to TC. PC also decodes any parameters which may be provided for each operator, and forwards these to the main Data Path DP.

TC either inserts the task into the active mix or enters a holding state if sufficient resources are not available for its insertion. The reasons why TC may not be able to insert the task include the following:

1. The mix may be full (that is, the hardware limit on the number of active tasks has been reached), in which case PC must wait for the termination of the Oldest Active Task (OAT);
2. Sufficient free registers may not exist to satisfy the task's requirements in which case PC must wait for other tasks to free enough registers;
3. One or more of the change queues required by the task (to be described later) may be locked, in which case PC must wait for them to become unlocked.

PC may also be used for the detection of external interrupt conditions and, with the aid of the Maintenance Processor MP (FIG. 1), also detects alarm interrupt conditions. Typically, these conditions may be handled by special tasks which PC inserts into the mix.

Management of Waiting Tasks and Wait Conditions

Figure 4:
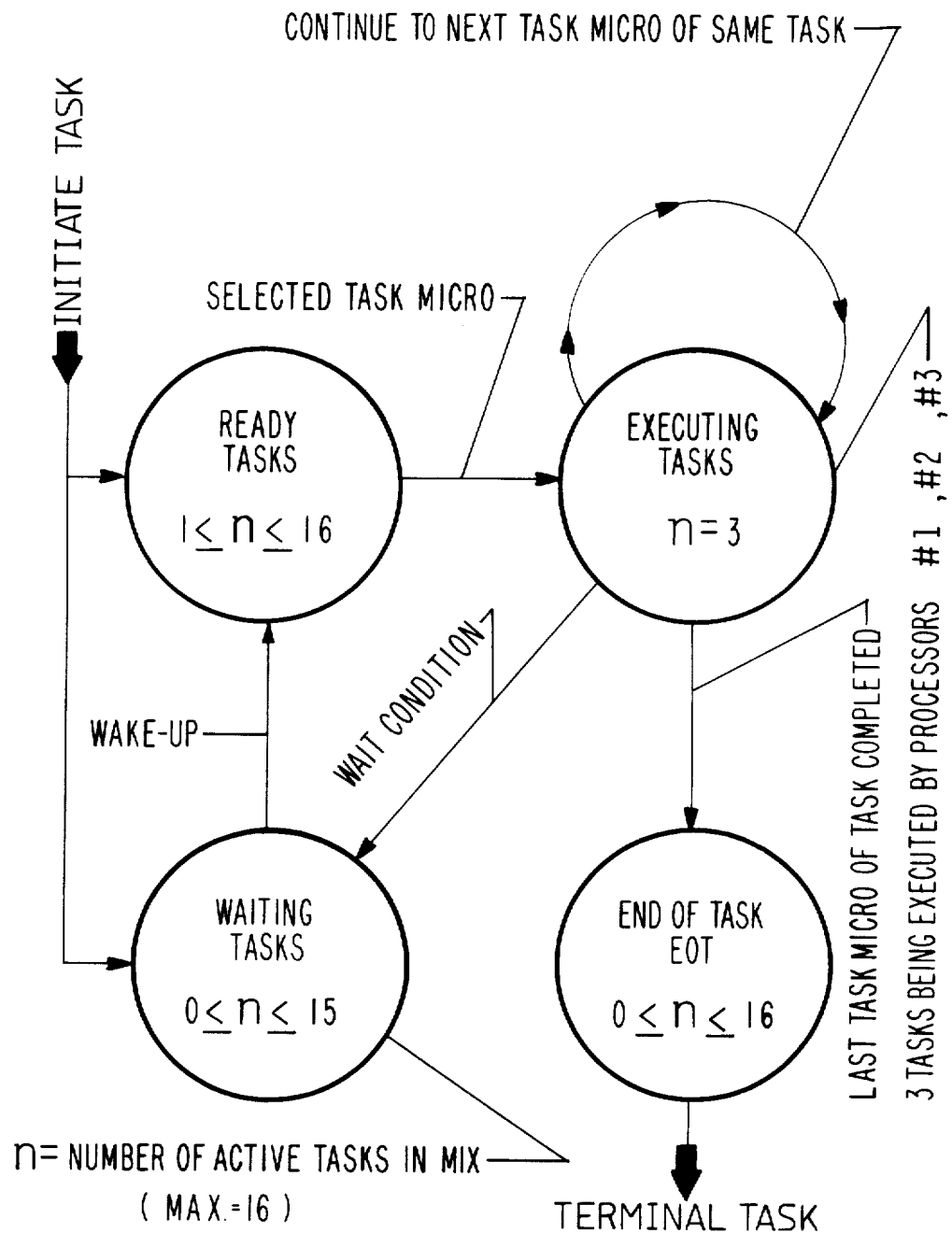
FIG. 4 diagrammatically illustrates the basic manner in which tasks are managed in a preferred embodiment.

During processor operation, every active task is in one of four states: (1) Executing (task is presently being executed), (2) Waiting (task is not ready for execution until some condition has been satisfied), (3) Ready (task is ready to be executed—that is, the task is not waiting on any condition), or (4) End Of Task (EOT) (task waiting to be terminated). The Task Controller TC keeps track of the state of each task. At the completion of each task microinstruction, TC is presented with an appropriate task status condition for use in determining whether the Executing state of the task should be continued, or the task put in another state (e.g. Waiting or (EOT)). FIG. 4 diagrammatically illustrates the manner in which the task states are managed in the preferred embodiment in which, for example, there may be a maximum of 16 active tasks and a maximum of three tasks being executed at any one time.

Selection of Ready Tasks

On each clock cycle, the Task Controller TC selects one task microinstruction to be executed from among the Ready tasks. This selected task microinstruction may be the first miscroinstruction of a newly activated task or a second, third, etc. microinstruction of a previously activated task which was previously put in a Waiting state (e.g. because not all the data required for the next task microinstruction was not available at that time). TC marks the selected task as "in execution" so that it will not select it again on the next clock cycle. This is done because, in the preferred embodiment, execution of each task microinstruction is performed in three stages requiring three clock cycles.

If there are no Ready tasks (i.e. all active tasks are either Waiting, Executing, or at (EOT)), then TC selects a special null task microinstruction which is always Ready. The null task microinstruction is never marked "in execution", so that it may be selected on the next clock cycle, if necessary. The null task microinstruction may, for example, simply be a loop of "null" operations.

If there is more than one Ready task, TC may, for example, make its selection according to a simple, static, two-level priority system. The distinction between high priority and low priority tasks may be indicated by the programmer of the instruction flow. Among tasks of the same priority, the selection by TC is arbitrary.

Synchronization of Tasks and Dynamic Register Assignment

For the preferred embodiment being considered, a conventional stack-oriented operator set may be assumed. A basic understanding of how one or more stacks may be employed in a data processing system can be obtained, for example, by reference to the article E. A. Hauck and B. A. Dent, "Burroughs B 6500/7500 Stack Mechanism", AFIPS Conference Proceedings, 1968 SJCC, p. 245; and also to the series of articles in Computer, May 1977, pp. 14-52, particularly the articles entitled: "Stack Computers: An Introduction", D. M. Bulman, pp. 18-28 and "Exploring a Stack Architecture", R. P. Blake, pp. 30-39. The contents and teachings of these articles are to be considered as incorporated herein.

The Burroughs 6800 computer system is an example of the use of a stack-oriented operator set. As is conventional in such a system, at least one stack is provided for operation in a manner such that communication between microinstructions normally occurs via the top of the stack. In order to further enhance this important communication mechanism, the present invention additionally provides a substantial number of "floating" top-of-stack register pairs. Operation is then caused to be such that the stack items which an operator takes as its input and the stack items which a task produces as its outputs are stored in register pairs which are assigned dynamically to the task when it is initiated into the mix of tasks. Each register pair has an associated validity bit, which indicates whether the corresponding stack item has been "produced". If a task microinstruction requires it to "consume" one of its input stack items which has not yet been produced, the task is put into a Waiting state by the hardware. It is put back into the Ready state when the stack item is produced.

The Task Controller TC keeps track of a virtual "top-of-stack image", which is a list of register pairs. This list indicates the top-of-stack configuration. TC also keeps a list of "free" (unassigned) register pairs. These lists are updated whenever a task is initiated or terminated.

As an example of the above, assume that the calculation $(A+B)-(1+C)$ is to be performed using tasks T1, T2, T3, T4, T5, T6 and T7 assigned as follows:

| Tasks | Operators |
|---|---|
| T1 | VALC A |
| T2 | VALC B |
| T3 | ADD: (A + B) = S1 |
| T4 | ONE |
| T5 | VALC C |
| T6 | ADD: (1 + C) = S2 |
| T7 | SUBTRACT: (S1 − S2) |

It will also be assumed for this example that no other tasks are active, that the top-of-stack list is empty, and that the free register list comprises eight registers R0, R1, R2, R3, R4, R5, R6 and R7 which are not currently assigned. The initial state of the Processing Element PE for this example is thus:

| | |
|---|---|
| Task mix: | No active tasks |
| Top-of-stack list: | No registers assigned (empty) |
| Free register list: | R0, R1, R2, R3, R4, R5, R6, R7 |

Assume now that task T1 (VALC A) is initiated. Task T1 requires no input from any of the top-of-stack registers, but requires one top-of-stack register for output A of task T1. Accordingly, the Task Controller TC assigns register R0 for output A. The state of the Processing Element PE thus becomes:

| | |
|---|---|
| Task mix: | T1 |
| T1 input(s): None; | T1 output(s): R0 |
| Top-of-stack list: | R0 |
| Free register list | R1, R2, R3, R4, R5, R6, R7 |

The next task T2 (VALC B) likewise requires no top-of-stack register for input, but requires one top-of-stack register for output B of task T2. Accordingly, the Task Controller TC assigns register R1 for output B. The state of the Processing Element PE thus becomes:

| | |
|---|---|
| Task mix: | T1 and T2 |
| T1 input(s): None; | T1 output(s): R0 |
| T2 input(s): None; | T2 output(s): R1 |
| Top-of-stack list: | R0, R1 |
| Free register list | R2, R3, R4, R5, R6, R7 |

The next task T3 (ADD: S1 = A + B) requires as inputs the A output of task T1 (in register R0) and the B output of task T2 (in register R1). Task T3 also requires one top-of-stack register for the output S1 = A + B of task T3 for which the Task Controller TC assigns register R2. The state of PE now becomes:

| | |
|---|---|
| Task mix: | T1, T2 and T3 |
| T1 input(s): None; | T1 output(s): R0 |
| T2 input(s): None; | T2 output(s): R1 |
| T3 input(s): R0, R1; | T3 output(s): R2 |
| Top-of-stack list: | R2 |
| Free register list: | R3, R4, R5, R6, R7 |

The next task T4 (ONE) requires not top-of-stack register for input, and one top-of-stack register for the "1" output of task T4 for which the Task Controller TC assigns register R3. The state of PE now becomes:

| | |
|---|---|
| Task mix: | T1, T2, T3 and T4 |
| T1 input(s): None; | T1 output(s): R0 |
| T2 input(s): None | T2 output(s): R1 |
| T3 input(s): R0, R1; | T3 output(s): R2 |
| T4 input(s): None; | T4 output(s): R3 |
| Top-of-stack list: | R2, R3 |
| Free register list | R4, R5, R6, R7 |

The next task T5 (VALC C) requires no top-of-stack register for input, but requires one top-of-stack register for output C of task T5 for which the Task Controller TC assigns register R4. The state of PE thus becomes:

| | |
|---|---|
| Task mix: | T1, T2, T3, T4 and T5 |
| T1 input(s): None; | T1 output(s): R0 |

| -continued | |
|---|---|
| T2 input(s): None; | T2 output(s): R1 |
| T3 input(s): R0, R1 | T3 output(s): R2 |
| T4 input(s): None; | T4 output(s): R3 |
| T5 input(s): None; | T5 output(s): R4 |
| Top-of-stack list: | R2, R3, R4 |
| Free register list: | R5, R6, R7 |

The next task T6 (ADD: S2=1+C) requires as inputs the "1" output of task T4 (in register R3) and the C output of task T5 (in register R4). Task T6 also requires one top-of-stack register for the output S2=(1+C) of task T6 for which the Task Controller TC assigns register R5. The state of PE becomes:

| Task mix: | T1, T2, T3, T4, T5 and T6 |
|---|---|
| T1 input(s): None; | T1 output(s): R0 |
| T2 input(s): None; | T2 output(s): R1 |
| T3 input(s): R0, R1; | T3 output(s): R2 |
| T4 input(s): None; | T4 output(s): R3 |
| T5 input(s): None; | T5 output(s): R4 |
| T6 input(s): R3, R4; | T6 output(s): R5 |
| Top-of-stack list: | R2, R5 |
| Free register list: | R6, R7 |

The final task T7 (SUBTRACT: S3=S1−S2) for this example requires as inputs the S1=(A+B) output of task T3 (in register R3) and the S2=(A+B) output of task T6 in register R5. Task T7 also requires a top-of-stack register for output S3=S1−S2 of task T7 which constitutes the result of this subtraction and (for which the Task Controller TC assigns register R6. The final state of PE for this example thus becomes:

| Task mix: | T1, T2, T3, T4, T5, T6 and T7 |
|---|---|
| T1 input(s): None; | T1 output(s): R0 |
| T2 input(s): None; | T2 output(s): R1 |
| T3 input(s): R0, R1; | T3 output(s): R2 |
| T4 input(s): None; | T4 output(s): R3 |
| T5 input(s): None; | T5 output(s): R4 |
| T6 input(s): R3, R4; | T6 output(s): R5 |
| T7 input(s): R2, R5; | T7 output(s): R6 |
| Top-of-stack list: | R6 |
| Free register list: | R7 |

As an aid in understanding the above example, reference is directed to FIG. 5 which summarizes the above-described activity involved in the performance of the exemplary calculation (A+B)−(1+C). Note that tasks T1, T2, T4 and T5 have no mutual dependencies and, thus, their performance may be overlapped. The performance of tasks T3 and T6 may also be overlapped, while the performance of task T7 must wait for its inputs until they have been produced by tasks T3 and T6.

Termination of Tasks

As each task is completed, the Task Controller TC records this occurrence by marking the task as having achieved end of task EOT.

When the Oldest Active Task (OAT) has reached (EOT) and its change queue entries have all been completed, it may be "terminated". To terminate a task, TC marks it as not active and advances the Oldest Active Task designation (OAT) to its successor. This termination of the oldest active task frees the Program Controller PC to insert another task if it was Waiting because of a full mix of tasks.

Register space allocated for "temporaries" is returned to the free list when a task reaches (EOT). However, register space for "inputs" is not returned to the free list until the task is actually terminated (this restriction improves the capability of restarting tasks in case of transient error conditions). Register space allocated for "outputs" is not returned directly to the free list. Output registers are added to the top-of-stack image and are used as inputs by subsequent tasks.

Multiple Tasks per Instruction

Typically, some of the high level instructions can be conveniently split into multiple tasks to be performed on the low-level processor. In this way, additional concurrency may be provided, and the overall performance of the system thereby improved.

Synchronization of Changes to State

Aside from changes to the top of the stack, most other effects that an operator can cause are changes to state such as to main memory. These state changes are synchronized by means of two change queues, the Memory Change Queue and the Address and State Unit Change Queue. These change queues (which will be described in more detail hereinafter) impose three kinds of order on the otherwise unordered execution of tasks.

First, consider the case of two tasks, T1 and T3 where T1 logically precedes T3. If T1 were to abort (for example, T1 may be an Add operator and may detect an exponent overflow condition), then any state changes attempted by T3 must not be allowed to occur.

Second, consider the case in which T1 and T3 both are to write in the same location in memory, but neither task aborts. In this case, the final result (after the execution of T3) must be that the value written by T3 should be in that memory location.

Third, consider tasks T1, T2, T3, and T4 (in that logical order). As before, assume that T1 and T3 both write to the same memory location. Also assume that T2 and T4 both read from that same location. In such a case, T2 must get the value written by T1, and T4 must get the value written by T3, regardless of the actual order of execution of the tasks.

In all three of the above cases, the required synchronization is accomplished by the use of change queues. Each of these change queues typically provides storage for a small number of "entries" arranged in a first-in-first-out queue. Each entry keeps information on a single state change. The entries are inserted into the queues by tasks in order to effect changes to the state of the system; the entries are removed by the hardware as the changes are actually made. A change is actually made to the state only when the task which originated the change has become the Oldest Active Task (OAT).

In order to guarantee that the changes to state are made in the same order as the logical task sequence, entries are placed into a change queue one task at a time, which is enforced by providing a "lock" on each queue. The Program Controller PC assigns the necessary locks to each task upon initiation. The locks are released by the task when it has inserted all of its entries into the queues. The Program Controller PC must, of course, wait until the previous task has released a lock before assigning it to another task.

Each entry to the change queue typically includes (1) a new value for some piece of state, (2) an address of that piece of state, and (3) validity bits for each of these components. The entries in the queue may be incomplete, as indicated by their validity bits. The task which inserts the entry into the queue may supply the address and the value separately, in either order.

When a task attempts to read a portion of the state, the appropriate change queue is checked by the hardware, in the following manner:

1. If the change queue is locked by a preceding task, then the reading task is put into a Waiting state until it is unlocked. If it is locked by the reading task or by a succeeding task, then the reading task may continue with the next step;

2. If the change queue contains any entries belonging to preceding tasks which have invalid addresses, then the reading task is put into a Waiting state until they are made valid. Entries belonging to the reading task or its succeeding tasks are ignored;

3. If the change queue contains any entries belonging to preceding tasks which have valid addresses which match the address the reading task is trying to read, then the most recently entered entry which meets this condition is checked further. If this entry has a valid value component, then this value is returned to the reading task as the desired value. If this entry has an invalid value component, then the reading task is put into a Waiting state until it is made valid;

4. If none of the above conditions holds, then the task reads the state directly.

Discontinuation of Tasks and "Backing-Up"

Under normal circumstances, the Program Controller PC and the Task Controller TC will attempt to keep as many tasks in the task "mix" as resources allow. Because error conditions typically occur only infrequently on a dynamic basis, PC and TC assume that error conditions will not occur and continue to initiate tasks. It is possible, therefore, that tasks may need to be discontinued if a logically preceding task detects an error condition after the initiation of its successor tasks.

Because changes to state are controlled by the change queues such that only the changes initiated by the Oldest Active Task (OAT) are ever actually made to state, it is relatively easy to discontinue unwanted tasks. All that is required is to remove them from the mix, delete their entries from the change queues (if any), and "back up" the register assignments to the point at which the error was detected.

Task Execution

As was pointed out previously, important features of the preferred embodiment of the invention being described herein reside in the employment of a multiple stage pipelined architecture whereby multiple tasks can be concurrently executed in a manner which permits advantage to be taken of both multiprogramming and multiprocessing techniques at a microinstruction level. A preferred manner for achieving these features in accordance with the invention will now be presented.

In the preferred embodiment of the invention, the implementation of the Processor Element PE in FIG. 3 is, for example, chosen to be such that a maximum of sixteen tasks may be active at one time. A preferred manner in which the Task Controller TC assigns resources for each activated task has already been described in connection with the exemplary calculation $(A+B)-(1+C)$ summarized in FIG. 5. It has also been described in connection with FIG. 4 how the activated tasks are managed with respect to the one of four possible states—Ready, Waiting, Executing and End of Task (EOT)—in which each activated task may reside.

Figure 6:
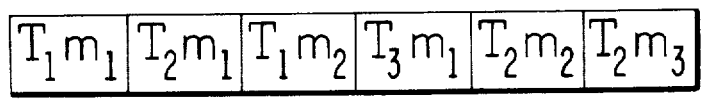
FIG. 6 illustrates an example of how task microprogramming may be provided in the preferred embodiment.

It will now be described how the preferred embodiment of the Processor Element PE provides for the concurrent execution of multiple activated tasks in a manner so as to achieve the advantages of both multiprogramming and multiprocessing at a microinstruction level. A first step in this regard is to provide for the performance of each task as a result of the sequential execution of a particular one or more task microinstructions accessed from the Stored Logic Controller SLC. For example, a task $T_1$ may be performed by executing three task microinstructions designated as $T_1m_1$, $T_1m_2$ and $T_1m_3$. As will be evident from the previous description with regard to task management (e.g., see FIG. 4), task microinstructions may be executed in any order regardless of the particular task to which each corresponds. Thus, a single processor can provide multiprogramming on a microinstruction level, since, while one task is Waiting for a condition which will permit its first or next task microinstruction to be made Ready for execution by the Task Controller TC, the processor is able to go ahead and execute other task microinstructions which are Ready. For example, assume that the three tasks $T_1$, $T_2$ and $T_3$ are active wherein: $T_1$ is a two-microinstruction task $T_1m_1$, $T_1m_2$ requiring a wait between $T_1m_1$ and $T_1m_2$; $T_2$ is a three-microinstruction task $T_2m_1$, $T_2m_2$, $T_2m_3$ requiring a wait between $T_2m_1$ and $T_2m_2$; and $T_3$ is a one-microinstruction task $T_3m$ which requires completion of task $T_1$ before it can be made Ready. A single processor is then able to provide execution in a multiprogramming manner by, for example, providing for executing these task microinstructions in the following sequence: $T_1m_1$, $T_2m_1$, $T_1m_2$, $T_3m_1$, $T_2m_2$, $T_2m_3$, as illustrated in FIG. 6. Preferably (and as indicated by the "Executing" circle in FIG. 4), when a particular task microinstruction is being executed, it is normally preferable to permit this task to continue and execute its next microinstruction, if Ready, even though other tasks may also have Ready microinstructions.

Having described how the preferred embodiment provides for the execution of task microinstructions using a single processor in a manner so as to take advantage of multi-programming, it will next be described how multiprocessing is additionally provided in a particularly advantageous manner in accordance with the invention. Basically, this additional multiprocessing capability is achieved in the preferred embodiment by the employment of a three-stage pipeline architecture which is implemented so as to in effect provide three separate processors operating 120° out of phase and sharing the same physical hardware. In order to take advantage of this 3-processor implementation the preferred embodiment not only provides for multiprogramming (as described above) by permitting task microinstructions from different tasks to be executed in intermixed fashion, but also, the preferred embodiment advantageously provides for multiprocessing by permitting a Ready task microinstruction to be selected for execution by any one of the three processors.

The preferred embodiment achieves this combined multiprogramming and multiprocessing of task microinstructions by providing an implementation having the following characteristics (1) and (2) set forth below:

(1) Provision is made for implementing SLC, DP and ASU in FIG. 3 so that the execution of each task microinstruction is performed in three stages requiring three consecutive clock periods. Typical 3-stage operation is such that, in the first clock period (first stage) of a task microinstruction, a Read operation is performed to prepare for execution of a selected microinstruction which includes reading out from storage the appropriate operand data to be used during microinstruction execution and also reading out the condition select data for use in determining the next microinstruction address. In addition, during this first clock period, appropriate fields of the microinstruction are used to derive control signals for use in controlling data path functions during the second clock period. In the second clock period (second stage) of a task microinstruction, a Compute operation is performed during which the selected microinstruction is executed and the selected conditions are tested to produce next microinstruction data. During the third clock period (third stage) of a task microinstruction, a Write operation is performed during which the results of microinstruction execution are written into storage and the next microinstruction data is used by the Task Controller to select the microinstruction to be performed during the next clock period.

Figure 7:
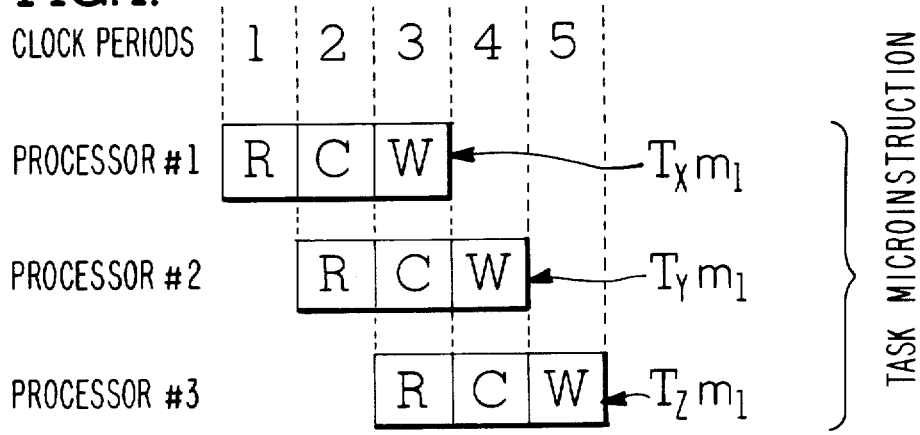
FIG. 7 illustrates how tasks are performed using the three-stage pipeline architecture provided for the preferred embodiment.

(2) In addition to the characteristics set forth in (1) above, the preferred embodiment also provides for the concurrent performance during each clock period of a Read operation for a first task microinstruction, a Compute operation for a second task microinstruction, and a Write operation for a third task microinstruction, whereby to achieve the effect of three different task microinstructions being concurrently performed by three different processors operating 120° out of phase with one another, as illustrated in FIG. 7 for task microinstructions $T_x m_1$, $T_y m_1$ and $T_z m_1$. The three-stage Read, Compute and Write operations respectively occurring for each task microinstruction in three consecutive clock periods (as described in (1) above) are respectively indicated in FIG. 7 by the letters R, C and W.

Figure 8:
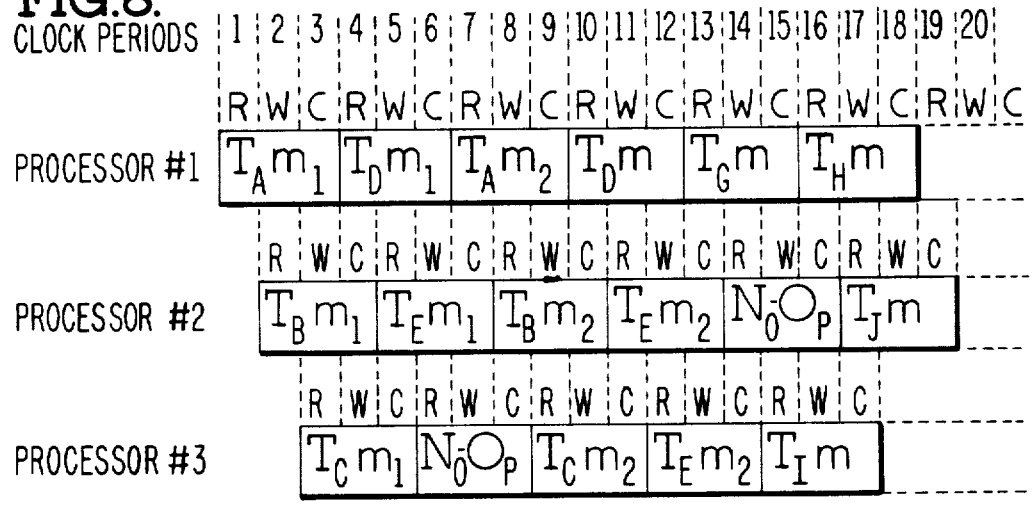
FIG. 8 illustrates an example of how the preferred embodiment employs tasking, microprogramming, and multiprocessing for concurrently performing the three calculations $(A+B)+(C+D)=H$; $(A+B)-E=I$; and $(C+D)-E=J$.

The multiprogramming capability illustrated in FIG. 6 for a single processor is utilized in the preferred embodiment in conjunction with the 3-processor multiprocessing capability illustrated in FIG. 7 so as to permit task microinstructions to be performed in a particularly expeditious manner which takes advantage of both capabilities. FIG. 8, for example, illustrates the performance of the three calculations $(A+B)+(C+D)=H$; $(A+B)-E=I$; and $(C+D)-E=J$ using, for example, ten tasks $T_A$ through $T_J$ assigned by the Task Controller TC as follows:

| Tasks | Operators |
|---|---|
| $T_A = T_A m_1$ w $T_A m_2$ | VALC A |
| $T_B = T_B m_1$ w $T_B m_2$ | VALC B |
| $T_C = T_C m_1$ w $T_C m_2$ | VALC C |
| $T_D = T_D m_1$ w $T_D m_2$ | VALC D |
| $T_E = T_E m_1$ w $T_E m_2$ | VALC E |
| $T_F = T_F m$ | ADD (A + B) = F |
| $T_G = T_G m$ | ADD (C + D) = G |
| $T_H = T_H m$ | SUBTRACT F − G = H |
| $T_I = T_I m$ | SUBTRACT F − E = I |
| $T_J = T_J m$ | SUBTRACT G − E = J |

It is assumed for the example shown in FIG. 8 that the "operand fetch" tasks $T_A$-$T_E$ each require two task microinstructions with at least a three clock wait period (indicated by "w" above) therebetween. It is also assumed that each of the "ADD" and "SUBTRACT" tasks $T_F$-$T_J$ require only one clock period (indicated above and in FIG. 8 by "m" having no subscript). Also note in FIG. 8 that a "No-Op" microinstruction is provided when there are no Ready task microinstructions.

DETAILED DESCRIPTION

The construction and arrangement of the preferred embodiment of the present invention will now be considered in more detail with reference to particular preferred implementations.

Program Controller PC (FIGS. 3 and 9)

As described previously in connection with FIG. 3, the Program Controller PC accesses program code words from the Memory System MS (FIG. 2), parses them into operators, and then decodes each operator to determine one or more tasks to be performed along with the resource requirements for each task. This decoded information, including a unique microinstruction entry address for the Stored Logic Controller SLC, is passed to the Task Controller TC so that a task may be assigned and initiated to perform each operator. At the same time, operator parameters, if any, are passed directly to the Main Data Path DP. Since the Task Controller TC manages the actual execution of tasks and coordinates multiple tasks, PC is free to scan ahead in the code stream, thereby minimizing the effect of its operations on processor performance.

In a preferred implementation, the Program Controller PC provides the following major functions:

1. Program word buffering.
2. Program word indexing.
3. Maintaining back-up for program indexing.
4. Operator decoding and parameter handling (Operator Decoder OD).
5. Program Controller and Task Controller HOLD/GO control.
6. Pseudo-opcode generating.
7. Initiating routines to handle external interrupt and alarm error conditions.

The manner in which the above functions are provided in a preferred implementation of PC will now be described with particular reference to FIG. 9.

Program Word Buffering

The Program Controller PC provides two program buffer registers P and Q for program word handling. Associated with each is a "register occupied flag", PROF and QROF, respectively. The P and Q registers can be indexed and the appropriate operator and parameter syllables selected. The "next" program word is pre-fetched into Q concurrently with decoding from P.

Program Word Indexing

PC has a Program Word Index Register PWI and a Program Syllable Index Register PSI which together function as a program counter. PSI, for example, may select using a Syllable Selector SS one of six opcode syllables from a program word in P for decoding by an Operator Decoder OD. When a word boundary is crossed, the "next" program word in Q is transferred to P, PWI is incremented, and a "Fetch" request is sent to the Address and State Unit ASU (FIG. 3). The output of PSI is also provided to ASU to calculate a memory address and initiate a memory read. When the new program word is loaded into Q, QROF is set by the memory. PWI and PSI can be loaded with different values (for program branching, etc.) from the Main Data Path DP (FIG. 3).

Program Index Backup File (PIBF)

Because of the multi-tasking capability provided in accordance with the invention, the performance of the tasks corresponding to one or more operators may sometimes have to be discontinued after they have been initiated. PC is thus provided with the capability of backing-up in the program stream, i.e., to return PWI/PSI to a previous value and to initiate a Fetch if PWI no longer points to the current program word. To effect this, PC provides a Program Index Backup File PIBF (FIG. 9) which records the values of PWI and PSI for all tasks. Upon receiving a back-up indication from TC, PC enters a HOLD state while reading PIBF to obtain the values of PWI and PSI which pointed to the syllable corresponding to the task causing the back-up. The PWI and PSI registers are then loaded with these values. An executing task has the capability of reading PIBF to obtain the values of PWI and PSI which existed at the time of its initiation.

Operator Decoding and Parameter Selection

The opcode syllable indexed by PSI is decoded by the Operator Decoder OD (FIG. 9) which typically yields operator characteristics such as:

1. The number by which PSI must be incremented to point to the next opcode syllable.
2. The number of succeeding syllables which are to be used as operator parameters.
3. Whether or not the operator is one of certain special operators which require special handling.
4. Whether or not PC should HOLD after initiating a task for the operator.
5. Whether or not the operator can be entered in Restart mode (thereby providing a pseudo-opcode for that purpose).
6. Task setup information and resource requirements.

Parameters

Parameters are selected from the output of the Syllable Selector SS in FIG. 9. After appropriate formatting by a Parameter Handler PH, the parameters are transferred to the Main Data Path DP (FIG. 3).

Restart Mode

A "Restart" flag in the Program Controller PC can be set from the Stored Logic Controller SLC (FIG. 3). It remains set until the next occurrence of a legitimate operator in which case it is reset and that operator is initiated in "Restart Mode" (accomplished by temporarily entering HOLD state and substituting a pseudo-opcode for the original opcode.)

Task Setup Information

The following information is typically provided to initiate a task for an operator and is passed to the Task Controller TC (FIG. 3) via the Task Setup Register (FIG. 9) TSR to which the output of the Operator Decoder OD is applied.

1. The number of inputs to be consumed from the stack controlled by the Task Controller TC.
2. The number of output and temporary registers to be assigned.
3. Initial WAIT condition—whether or not the task should wait for the topmost stack register to become valid before being made ready for execution.
4. Alternate WAIT condition—whether or not the task should wait on the "earliest of two registers" (the two topmost stack registers) to become valid.
5. Whether or not the task should be given priority in being selected for execution.
6. Whether or not the stack should be adjusted so that only the task's inputs are in the top-of-stack.
7. Whether or not the task changes "state".
8. Whether or not the task belongs to a set representing a multi-task operator.
9. Whether or not the task represents a pseudo-operator.
10. Initial Task Microinstruction Address ITCA for SLC (FIG. 3).
11. ASU Change Queue ACQ lock request.
12. Memory Change Queue MCQ lock request.

HOLD/GO Control

As described previously, the Program Controller PC and Task Controller TC (FIG. 3) work in tandem to generate a continuous stream of tasks to be performed. As also described previously, PC determines the characteristics of a task and loads this information into the Task Setup Register TSR (FIG. 9). Further responsibility is then assumed by TC, including the assignment of an actual task number and initiation of the task.

A number of conditions can prevent immediate initiation of a task using the information in TSR. Consequently, PC has the capability of placing itself and TC in a HOLD state. These conditions are:

1. Waiting for a program word fetch.
2. HOLD signal from SLC or Operator Decoder OD.
3. PC detects an external interrupt or alarm error and must insert a pseudo-op to handle it.

Other conditions, originating in TC, may also prevent immediate initiation of a task. These conditions are:

4. The number of output and temporary registers required for the next task (as specified by TSR) is greater than the number of registers available. (HOLD condition will persist until a currently active task releases some of its registers).
5. The number of outputs which the next task will place on the stack, after allowing for the inputs used by the task, is greater than the number of unoccupied positions in the Top of Stack List. (HOLD while PC inserts a "push task.")
6. The number of inputs required by the next task is greater than the number of entries in the Top of Stack List. (HOLD while the PC inserts a "pop task.")
7. The next task requires that only its inputs be in the Top-of-Stack. (HOLD while PC inserts a "push" or "pop task.")
8. TC has reached its limit for concurrent tasks. (HOLD until a task terminates.)
9. An ACQ lock request occurs and the ASU Change Queue is locked.
10. An MCQ lock request occurs and the Memory Change Queue is locked.

Pseudo-Opcode Generation

Pseudo-ops may be inserted into the code stream by a Pseudo-Opcode Generator POG (FIG. 9) or independently by an SLC microinstruction. PC will use pseudo-ops to perform control functions such as stack push/pop and interrupt handling. Pseudo-ops may also be used for functions such as handling operator-dependent interrupts and generating other than the first task of multi-task operators.

The pseudo-opcode is either generated internally by POG based on the specific function to be performed or obtained from DP upon receipt of an appropriate SLC microinstruction. When a pseudo-op is to be inserted, the HOLD state is first invoked. This prevents a task from being initiated using the setup information currently in TSR. Selection (for operator decoding) of the opcode syllable indexed by PSI is over-ridden by selection of the pseudo-syllable. New setup information is loaded into TSR, HOLD is removed and a task is initiated. The pseudo-op does not increment PSI so TSR is again loaded with setup information for the operator which was preempted by the pseudo-op. If no further HOLD condition exists, task initiation then proceeds in the usual manner.

For certain sequences of operators, the insertion of a pseudo-op is not permitted. For example, insertion of a pseudo-op is not permitted when PC has been placed in a HOLD state by SLC or by the HOLD output of the Operator Decoder OD. This insures the correctness of the PWI/PSI values which are associated with the pseudo-op by preventing insertion in such situations as (1) while PWI/PSI are being changed—due to a branching operator, or (2) between the separate tasks of a multi-task operator. (Operators which cause unconditional branching invoke the HOLD state at initiation time via TSR, as does the first task of a multi-task set; conditional branching operators may invoke a HOLD state using an SLC microinstruction).

Figure 10:
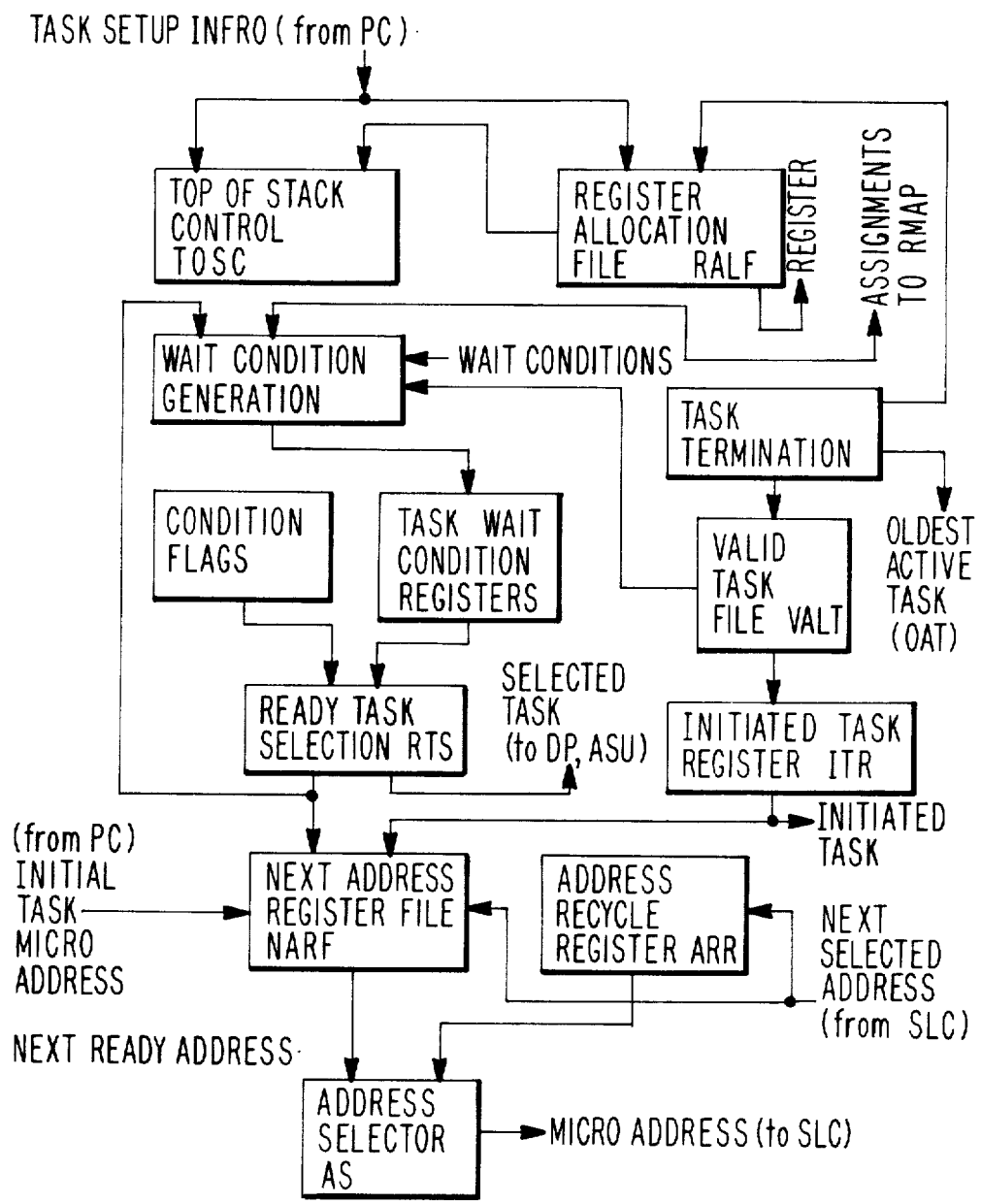
FIG. 10 is a block diagram illustrating a preferred embodiment of the Task Controller TC of FIG. 3.

Task Controller (TC) (FIGS. 3 and 10)

The Task Controller TC assigns a task in response to the task data or pseudo-operator supplied by the Program Controller PC. It manages the utilization of processor resources in such a way as to achieve a high level of concurrency of operator execution, while maintaining sequential order where required. The Task Controller TC coordinates the execution of numerous tasks in various stages of completion so that no task is unnecessarily delayed when resources are available for its independent operations.

The major functions of the Task Controller TC are set forth below:

1. Register allocation
2. Top-of-Stack control
3. Task initiation
4. Task termination
5. HDP task initiation and termination
6. Discontinuing successor tasks (back-up)
7. Task Wait conditions and Ready task selection
8. Microinstruction address selection The manner in which the above functions are provided in a preferred implementation of TC will now be described with particular reference to FIG. 10.

Register Allocation

Figure 14:
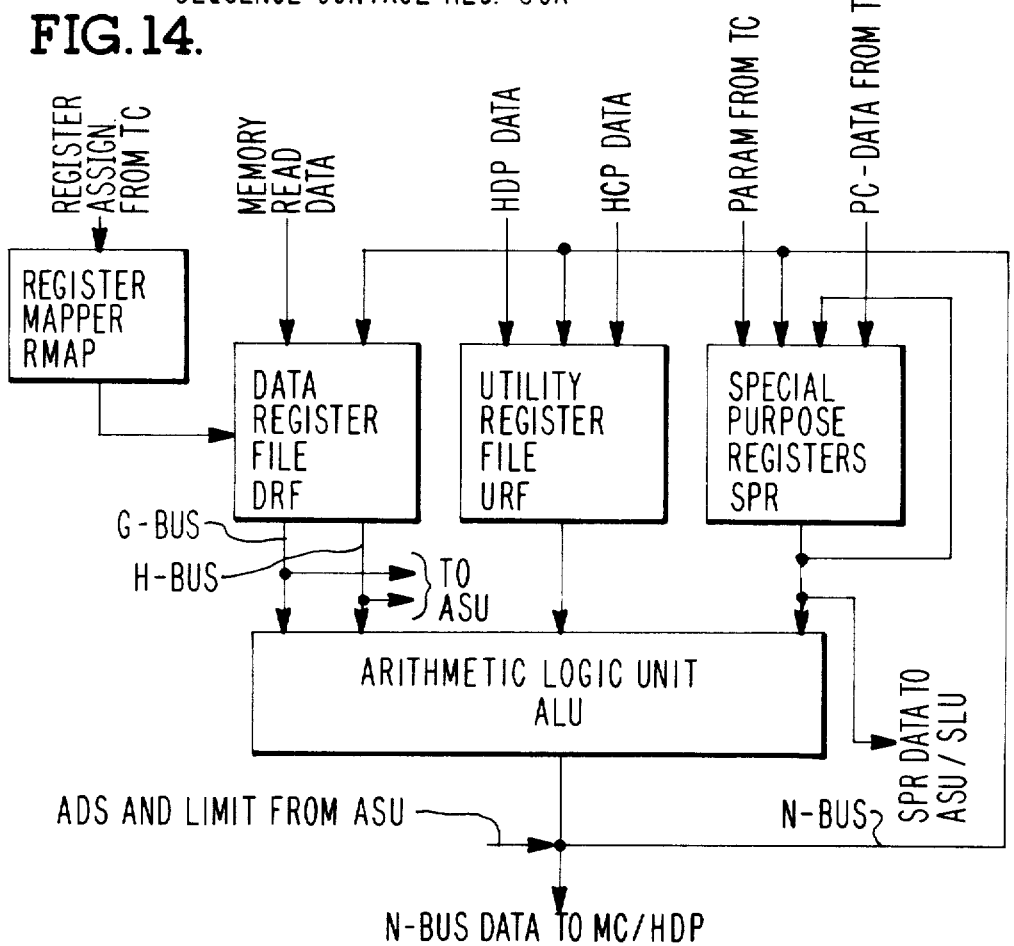
FIG. 14 is a block diagram illustrating a preferred embodiment of the main Data Path DP in FIG. 3.

As generally described previously, the Main Data Path DP (FIG. 3) of the Processing Element PE contains pairs of working registers which may be allocated to tasks according to their needs, the number of input, output, and temporary registers required by a task being specified by the Program Controller PC via the Task Setup Register TSR (FIG. 9). The Task Controller TC maintains a register allocation list in a Register Allocation File RALF (FIG. 10) which dynamically tracks the register use status (registers assigned vs. free registers available). More specifically, TC first determines if there are enough free registers available to meet the needs of the next task. If so, TC then performs the following functions:

1. Assigns the required number of registers for outputs and temporaries while selecting the proper number of inputs from the Top-Of-Stack, the specific assignments then being written into the Register Map RMAP of DP (FIG. 14);

2. Records the register use status as it existed prior to initiation of the task by writing the register allocation list into the Register Allocation File RALF (for "back-up" purposes); and 3. Updates the register allocation list to provide current status to a subsequent task.

If, on the other hand, there are not enough free registers, TC is then placed in a HOLD state until enough registers become available, while PC is also signalled to HOLD.

The registers assigned to a task by TC are de-allocated (by updating the register allocation list) at two different times. Temporary registers are released when the task reaches the "EOT" condition and inputs are released when the task is terminated. Output registers, however, are passed to a successor task as its inputs (by adding them to the Top-Of-Stack) and reassigned to that task via RMAP of DP (FIG. 14).

Top-of-Stack Control

The Top-Of-Stack TOS is formed by a dynamically-allocated group of registers in RALF of the Main Data Path DP (FIG. 14) which is a logical extension of the in-memory stack of the process currently being executed. Registers designated as being in the Top-Of-Stack will previously have been assigned by the register allocation mechanism.

The Top-Of-Stack TOS may typically comprise seven registers. TC updates TOS each time a new task is initiated based on the number of inputs and outputs which are specified by PC via the Task Setup Register TSR (FIG. 10). A task's inputs are obtained from TOS and its outputs placed in TOS ("push" and "pop" tasks are unlike other tasks in that they access the bottom-most entry in the top-of-stack).

TC includes a Top-Of-Stack Control TOSC (FIG. 10) which dynamically tracks the Top-Of-Stack status by maintaining a TOS list and a TOS number. The TOS list is a list of the registers currently in TOS, while the TOS number indicates the number of registers currently in TOS. TC uses the TOS list and TOS number to determine if all the inputs for the next task are in TOS. If so, these input registers are provided to RMAP (FIG. 14) in DP for assignment. If all inputs are not in TOS, TC is placed in a HOLD state and PC is signalled that a "pop task" must be inserted before the corresponding task can be initiated. If a task will leave more outputs on the stack than it will consume inputs, TC determines if the Top-Of-Stack limit will be exceeded. If so, TC is placed in a HOLD state and PC is signalled that a "push task" must be inserted.

For back-up purposes, TC also functions to maintain a record of the status of TOS as it existed prior to initiation of the task by writing the TOS list and TOS number into a TOS file contained in TOSC (FIG. 10), while also updating the TOS list and TOS number to provide current status to a subsequent task.

When a push or pop task is inserted, PC and TC are released from HOLD state. Since HOLD prevents PSI (FIG. 9) from being incremented, a second attempt is made to initiate a task for the operator. It is again subject to the previously described conditions and additional push or pop tasks may be inserted. (Note that each push task removes one register from the top-of-stack and each pop task adds one register).

Task Initiation

When an operator's characteristics are specified by the Task Setup Register TSR of PC (FIG. 9), the "next" task, as it has been previously referred to, is really only a potential next task. It is only when it has been determined that the necessary resources are available and that no HOLD condition exists does the potential next task become the actual next task and is referred to thereafter as the "initiated task". Sometimes a potential next task turns out not to be the next task at all, as in the case where a HOLD is imposed and tasks are inserted to perform pseudo-ops.

When a task is initiated, it is assigned a task number. The limit on the number of concurrent tasks may, for example, be 16. Task numbers are typically assigned to "ordinary tasks" on a "round-robin" basis. All such tasks (excluding HDP and null) are subject to order-of-precedence. This order is insured by also maintaining a record of the "Oldest Active Task" OAT. The successor/predecessor relationship between any two tasks can, for example, be determined by comparing their task numbers A and B with OAT as follows:

A is a strict predecessor of B if and only if $$[A > B \text{ AND } (OAT \leq A \text{ OR } OAT > B)]$$

OR $$[A > B \text{ AND } (OAT \leq A \text{ AND } OAT > B)]$$

The Task Controller TC in FIG. 10 also includes an Initiation Task Register ITR which contains the number of the task which was initiated on the previous clock. ITR operates to address a Next Address Register File NARF for writing in the initial task microinstruction address for the task just initiated. ITR also addresses the Register Map RMAP in DP (FIG. 14) for recording register assignments, and also addresses a Special Purpose Register File SPRF in DP for recording parameters (extracted from the code stream) which are to be associated with the task just initiated.

The Task Controller TC in FIG. 10 additionally maintains a Valid Task File VALT which keeps track of which tasks have been initiated and are in some stage of completion. When the task limit has been reached, a HOLD condition will exist in TC and be signalled to PC, preventing further initiation of tasks until a task terminates.

At initiation time, TC may also record certain special characteristics of each task obtained from PC which become pertinent, for example, when tasks are being discontinued. Such characteristics may, for example, indicate whether or not the task changes "state" information, and whether or not the task is a member of a set representing a multi-task operator.

Task Termination

A task is terminated by marking it "not valid" in the Valid Task File VALT (FIG. 10). Before a task can be terminated it must satisfy the following conditions:

1. The task must have reached End-Of-Task (EOT) and signalled that condition by an SLC microinstruction.

2. The task must be the Oldest Active Task (OAT), to insure the sequential order of the program segment being performed.

3. The task must have no entries in the Change Queue of ASU (FIGS. 3 and 15) and MS (FIGS. 2 and 17) for which a write has not been initiated.

When the above three conditions are satisfied, the task is marked "not valid", input registers are returned to the pool of free registers, the loop timer is reset, and the immediate successor of (OAT) becomes the new (OAT).

HDP Task Initiation and Termination

When an HDP task from (HDP FIG. 2) is inserted into the mix by PC, it is initiated in the usual way by TC with the exception that it is always assigned a predetermined task number. If the HDP task is already valid, no action will occur. The HDP task will remain valid until it is terminated by TC. Termination is not subject to the same conditions as for ordinary tasks with respect to (OAT) and the change queues. Reaching (EOT) is all that is required.

Discontinuing Successor Tasks ("Back-up")

At some point in the performance of a particular task, a situation may occur which renders the results of successor tasks incorrect or unnecessary (e.g., operator-dependent interrupts or assumed branch paths not taken). When this happens, a task will communicate its intention to discontinue successor tasks by requesting a DS lock provided in TC. If the DS lock is already locked, the task will be "put to sleep" until the lock is free. The task which has the lock (DS lock owner) will cause TC to perform the following actions by the command DS successors:

1. Go into HOLD state and signal PC to HOLD also; put all tasks to sleep (HDP task excluded).

2. Discontinue all successors of the DS lock owner (by marking them "not valid" in the Valid Task File VALT (FIG. 10) and signalling other controllers to do likewise.

3. Reset (EOT) flags of all discontinued tasks.

4. Back-up the Register Allocation List RALL (FIG. 10) to indicate the register use status just before the DS lock owner was initiated.

5. Back-up the TOS list and the TOS number maintained by TOSL (FIG. 10) to indicate the Top-Of-Stack status just before the DS lock owner was initiated.

6. Signal PC to back-up PWI and PSI by loading from PIBF (FIG. 9).

7. Make the "next task" to be initiated the immediate successor of the DS lock owner (i.e., set the Next Address Register File NARF (FIG. 7) to the appropriate successor task number).

8. Free the DS lock and wake up tasks.

The actions which result from DS lock and DS successors (and all other SLC microinstructions as well) are inhibited if a present cycle abort is indicated. Tasks may also be discontinued by TC as a result of an error. In this circumstance, TC will use the DS lock to prevent conflict. If the DS lock is already locked, TC will wait until the lock is free.

Task Wait Conditions and Ready Task Selection

Once a task has been initiated, it is made Ready for performance unconditionally, if no initial Wait condition is specified, or conditionally, if an "initial Wait condition" or "alternate Wait condition" is invoked via the Task Setup Register TSR (FIG. 9). The initial Wait condition is the validity of the task's input register which is topmost on the stack. The alternate Wait condition is that of waiting on the "earliest of two" input registers (the two topmost on the stack) to become valid. If the register specified by the initial or alternate Wait condition is valid at initiation time, or if no initial Wait condition was specified, the task is Ready and may be selected for execution. The "validity" of each register is indicated by a stack item available flag which is located in TC. After a task has been selected for performance, it may at any time be put into the Wait state ("put to sleep") either explicitly by a microinstruction or implicitly by hardware conditions which exist at the time a microinstruction is executed.

Typical explicit Wait conditions are:

1. Memory-complete—Each task has its own MAC (Memory Action Complete flag) which is set when a memory operation has been successfully completed.

2. Myself-equal-OAT—Wait until task is the Oldest Active Task OAT.

3. HDP-complete—Wait until HDP (FIG. 2) has completed an independent operation in progress. (This Wait condition applies to HDP task only).

Typical implicit Wait conditions are:

1. ACQ-change—Wait until the ASU Change Queue ASU-CQ (FIG. 15) has changed states. (This Wait condition is invoked dynamically if a task attempts to get a slot in ASU-CQ and a slot is not available.

Figure 17:
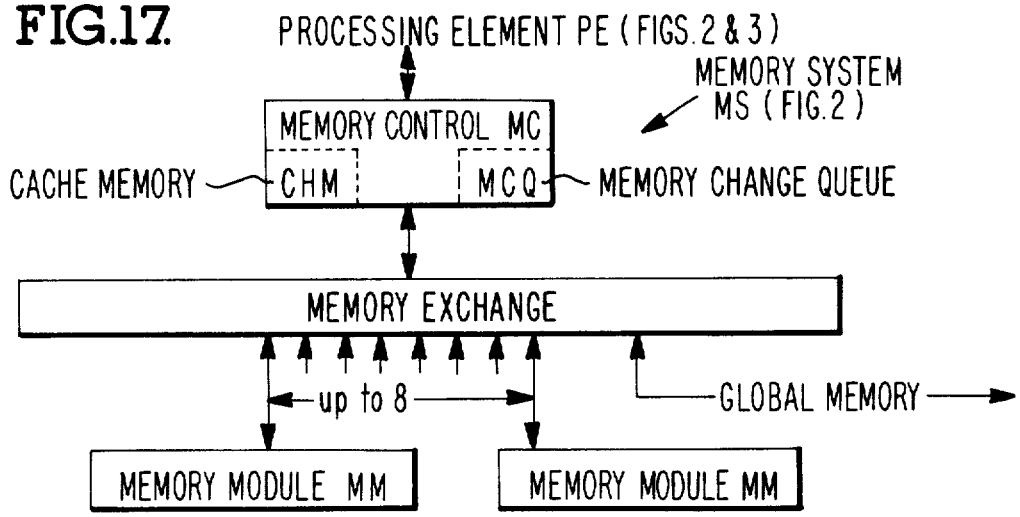
FIG. 17 is a block diagram illustrating a preferred embodiment of the Memory System MS in FIG. 2.

2. MCQ-slot-available—Wait until slot is available in the Memory Change Queue MCQ (FIG. 17).

3. DS lock-free—Wait until the DS lock (provided by TC) is not locked.

Special Wait Condition

If a task has not been put to sleep, it remains Ready and may be selected for performance. A task will receive priority over other Ready tasks if priority was specified via the Task Setup Register TSR (FIG. 9). From the set of all Ready tasks of equal priority, one task microinstruction is selected for execution during each clock period that the processor is not halted. Since execution of a task microinstruction requires multiple clock cycles (see FIG. 7), TC marks the selected task as "in execution" to prevent selecting it again on the next clock cycle. Whenever there are no Ready tasks and the processor is not halted, the null task microinstruction is selected and is equivalent to a No-Op.

Microinstruction Address Selection

When a task microinstruction is selected, a microinstruction address is read out of the Next Address Register File NARF (FIG. 10) and sent to the Stored Logic Controller SLC (FIG. 3). For the first microinstruction of a task, this address will be the initial task microinstruction address recorded at initiation time. During the Write clock period (see FIG. 9) of each task microinstruction, a next selected address is determined by SLC and sent back to TC to replace the previous address in NARF (FIG. 10). NARF is best thought of as a file of microinstruction address registers, one per task, which is used in implementing multiprogramming in accordance with the invention.

In addition to storing the next selected microinstruction address in NARF for an executing task, TC also places it in an Address Recycle Register ARR (FIG. 10). This register is used for optimization purposes and allows for overriding the Ready task selection operations performed by a Ready Task Selector RTS (FIG. 10) to give an executing task top priority to continue to the next task microinstruction as long as it does not encounter a Wait condition. After examining Wait conditions during each clock cycle, TC selects the next microinstruction address either from ARR for the current task (if Ready), or from NARF for a Ready microinstruction of a different task.

When no task is currently being performed and no other task microinstructions are in the Ready state, the null task is selected, as previously mentioned. The null task addresses the slot in NARF which is loaded with the microinstruction address provided at system initialization time. This address corresponds to a microinstruction which performs a No-Op function with respect to the code stream being processed by PC. However, if desired the null task could be used to perform some system control or monitoring function.

The Stored Logic Controller SLC (FIGS. 3 and 11-15)

The Stored Logic Controller SLC is that part of the Processing Element PE (FIG. 3) which contains the task microinstructions and uses these microinstructions to control the performance of the other parts of the processor as required for performing each task. SLC typically comprises a Microinstruction Memory MM (FIG. 11), a Microinstruction Register MR for receiving microinstructions read out from MM, a Sequence Control Memory SCM (FIGS. 11 and 13), an Auxiliary Control Memory ACM, a Next Address Selector NAS, and a Subroutine Control Circuit SCC.

The Microinstruction Memory MM may, for example, be a random access memory containing stored microinstructions. The Sequence Control Memory SCM is a logical extension of MM and contains branching information respectively corresponding to microinstructions stored in MM. (For example, see the aforementioned U.S. Pat. No. 4,155,120). The Auxiliary Control Memory ACM typically contains mask and rotate values for the Main Data Path DP (FIG. 14). These values may be selected statically, by addresses from MM, or dynamically, by addresses obtained from DP.

The Next Address Selector NAS operates to determine the next microinstruction address in response to sampling selected conditions indicative of the state of the rest of the processor. Both conditional and unconditional dynamic and static branching are typically performed.

The Subroutine Control Circuit SCC permits efficient sharing of microinstruction subroutines. It may typically comprise a stack of microinstruction addresses. A subroutine is "entered" by pushing the present microinstruction address plus an offset onto the subroutine stack and branching to the first instruction of the subroutine. A subroutine is "exited" by branching to the microinstruction address on top of the subroutine stack and popping that address from the stack.

The various components of SLC will now be considered in further detail.

Figure 11:
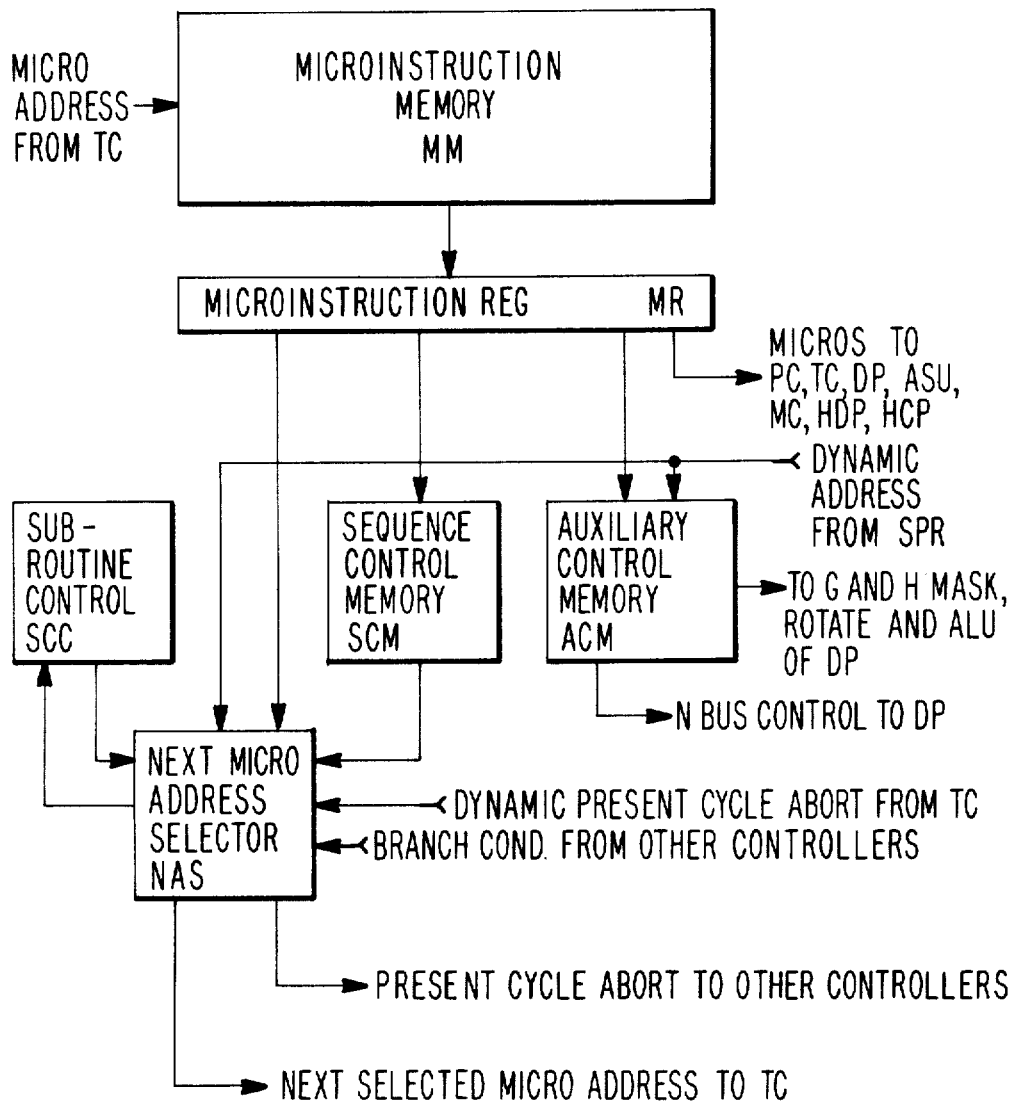
FIG. 11 is a block diagram illustrating a preferred embodiment of the Stored Logic Controller SLC in FIG. 3.

Microinstruction Memory (FIG. 11)

During the Write operation performed during the terminal portion of each clock cycle, Microinstruction Memory MM (in response to a microinstruction address provided by TC) reads out a selected task microinstruction into the Microinstruction Register MR for use in the next clock cycle. A microinstruction typically comprises a series of control fields which provide control signals to various portions of the processor during task execution.

Figure 12:
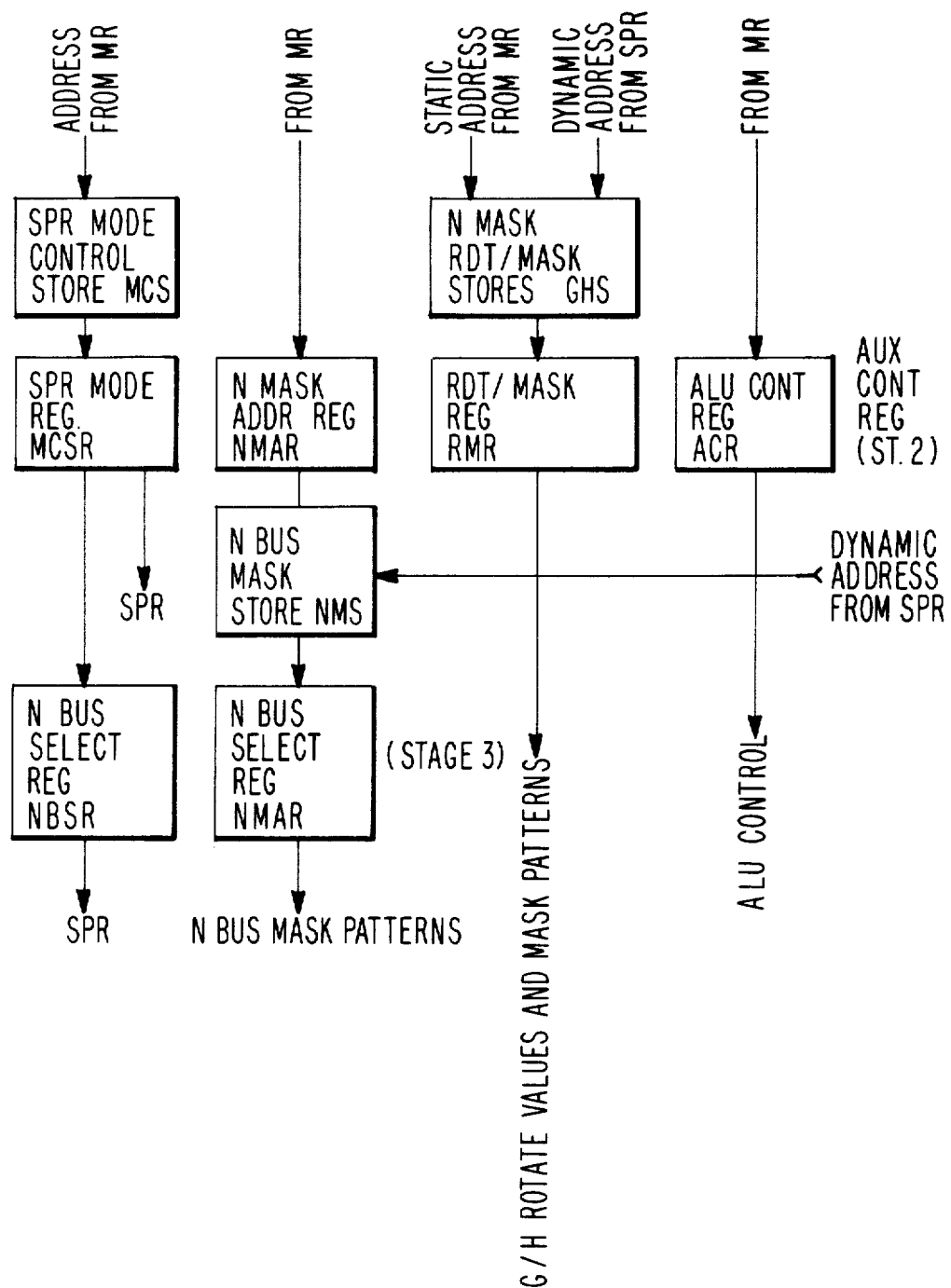
FIG. 12 is a block diagram illustrating a preferred embodiment of the Auxiliary Control Memory ACM in FIG. 11.

Auxiliary Control Memory ACM (FIGS. 11 and 12)

As illustrated in FIG. 12, the Auxiliary Control Memory ACM typically comprises various control devices and associated registers. During the Read operation portion of each clock cycle, these control devices receive patterns (from MR and other registers) for use in controlling various functions of the Main Data Path DP (FIGS. 3 and 14) during the next following Compute operation portion of the clock cycle. These control devices are addressed during the Read operation by multiplexing fields from the Microinstruction Register MR (FIG. 11) (static) and also by fields from Special Purpose Registers SPR (dynamic) contained in the Main Data Path DP (FIG. 14).

G and H Rotate and Mask Stores GHS (FIG. 12)

The G and H Rotate Stores GHS of ACS supply rotate values and mask patterns for DP (FIG. 14) and are addressed by either a field from MR (FIG. 11) (static), or by a field from the DP's SPR (dynamic).

N Bus Mask Store NMS (FIG. 12)

The N Bus Mask Store NMS contains patterns to control masking into the Data Register File DRF in DP (FIG. 14). The N Bus Mask Store NMS is addressed (via an N Mask Address Register NMAR) by a field from MR (static) or directly by a field from the DP's SPR (dynamic).

SPR Mode Control Store MCS (FIG. 12)

The SPR Mode Control Store MCS is addressed by a field in MR and contains the patterns to control SPR mode operations in DP (FIG. 14) and also the selection of data to be applied thereto.

Figure 13:
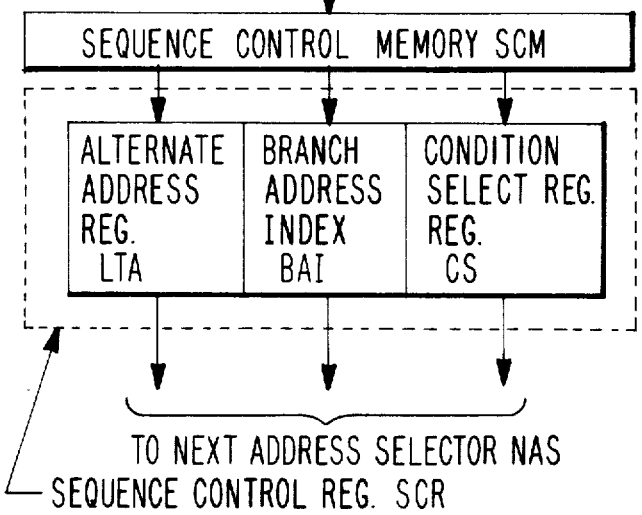
FIG. 13 is a block diagram illustrating a preferred embodiment of the Sequence Control Memory SCM in FIG. 11.

Sequence Control Memory SCM (FIGS. 11 and 13)

The Sequence Control Memory SCM contains sequencing information for use in determining which microinstruction in the Microinstruction Memory MM (FIG. 11) will be executed next. More detailed information with regard to such means is disclosed in the aforementioned U.S. Pat. No. 4,155,120. SCM is addressed by an address field contained in a microinstruction residing in the Microinstruction Register MR (FIG. 11). The addressed information from SCM is read into a Sequence Control Register SCR. This information from SCM typically comprises an Alternate Address field ALTA, a Branch Address Index field BAI, and a Condition Select field CS which, as indicated in FIG. 13, are read into respective registers ALTA, BAI and CS.

Next Address Selector NAS (FIG. 11)

The Next Address Selector NAS is used in determining the next microinstruction address. During the Compute operation of each clock cycle, NAS uses the Condition Select field in CS (FIG. 13) to select four possible branch conditions from the many possible branch conditions applied to NAS from other parts of the Processing Element. The actual values of these four selected branch conditions are concatenated together to form a four-bit value which is used to select one of 16 subfields from the Branch Address Index field in BAI (FIG. 13). Each subfield contains a branch address index and a present cycle abort indication. The branch address index of the selected subfield is in turn used to select one of eight next microinstruction addresses, four of which are provided by ALTA (FIG. 13). NAS applies the selected next microinstruction address to the Next Address Register File NARF in TC (FIG. 10). Then, during the next following Write operation in the current clock cycle, this selected next address determined during the Compute portion of the clock cycle is used to address the Microinstruction Memory MM (FIG. 11) so as to read out into MR the selected microinstruction to be used in the next cycle.

Present Cycle Abort

The Stored Logic Controller SLC (FIG. 10) contains a feature to prevent the execution of a microinstruction if the conditions of the hardware are not as were expected. For example, when attempting to add two single precision operands, if one turns out to be double precision, SLC will indicate a Present Cycle Abort and select one of the alternate addresses provided by ALTA (FIG. 13) rather than continue in the expected sequence. This action is referred to as static Present Cycle Abort and is determined by the microinstruction. Other conditions can also cause a microinstruction to abort for example, when execution of an add microinstruction occurs and one of the registers expected to contain an operand is not valid. In this case the present address will be used as the next MM address and thus allow the microinstruction to be re-executed. This is referred to as dynamic Present Cycle Abort. If static and dynamic Present Cycle Abort occur simultaneously, the static abort will take precedence.

Subroutine Control Circuit (FIG. 11)

The Subroutine Control Circuit SCC of SLC provides for sharing common microinstruction sequences (subroutines). Multi-level subroutine structure is allowed by utilizing a stack which may typically accommodate as many as 15 levels of entry. A stack is used to store the subroutine return address. Typically 16 stacks may be provided, one for each task.

The Main Data Path DP (FIGS. 3 and 14)

The purpose of the main Data Path DP is to store the primary data items for all of the tasks in the mix and to perform the logical and arithmetic operations on these data items during the Compute operation portion of each clock cycle in response to the applicable microinstruction fields. DP typically comprises a Data Register File DRF for storing data (including top-of-stack data), a Utility Register File URF for storing input/output data, a Register Mapper RMAP for converting task-relative addresses for DRF into absolute addresses according to register assignments made by the Task Controller TC (FIG. 10), an Arithmetic Logic Unit ALU for performing arithmetic and logical operations on applied data, and Special Purpose Registers SPR for auxiliary counting and data-manipulation functions.

During a clock cycle typical operation of DP is as follows. During the initial Read operation portion of the clock cycle, two words in DRF (selected by appropriate microinstruction fields in MR (FIG. 11)) are accessed, appropriately aligned and masked, and then applied to ALU. During the next following Compute operation portion of the cycle, ALU performs arithmetic and/or logical operations on the applied words as determined by control signals from ACM (FIGS. 11 and 12) of SLC and also from SPR. During the terminating Write operation portion of the clock cycle, the results provided by ALU are written back, via the N-Bus, into DRF and/or applied to other units, such as MS, HDP, or HCP (FIG. 2).

Data Register File DRF (FIG. 14)

DRF may typically be a random access memory having an Address input, two read ports (G-Bus and H-Bus), one write port for N-Bus input data, and also an input for Memory data, each addressed independently via a microinstruction from SLC. To facilitate the manipulation of partial fields within a word of data, rotation and masking facilities are provided for the G-Bus and H-Bus outputs of DRF, and write-control masking is provided for the Write port of DRF. In addition, the Write port of DRF typically includes an associated write-control mask facility which allows only selected bits of an ALU result word to be written, all other bits of the addressed word in DRF remaining unchanged.

Register Mapper RMAP (FIG. 14)

The Register Mapper RMAP is used to convert the logical register addresses used by a microinstruction to the physical register addresses that have been assigned to a task. The register assignments for a task being initiated are generated by the Task Controller TC (FIG. 10) and written into a task number associated location in RMAP.

When a Task is selected by the Task Controller TC, its task number is used to index into RMAP to obtain the addresses of its physical registers in DRF.

Utility Register File URF (FIG. 14)

The Utility Register File URF is used to hold data from HDP (FIG. 2) and other non-task-dependent data. Typically, three write ports are provided into URF, one for N-Bus data, one for HDP data, and one for HCP data. SLC, via the N-Bus, supplies a URF address, which is used for both reading and writing.

Arithmetic Logic Unit ALU (FIG. 14)

The Arithmetic Logic Unit ALU performs arithmetic and/or logical operations on the data appearing on its G-Bus and H-Bus inputs during the Compute operation portion of a clock cycle and applies the result to the N-Bus.

Special Purpose Registers SPR (FIG. 14)

The Special Purpose Registers SPR in DP are used (among other purposes) for storing those data items on which dynamic fields are dependent. Under control of SLC, selected portions of SPR can be used to control rotation and/or masking (including write-control masking) independently for the three ports of DRF.

Data items are loaded into SPR from ALU, and the data in SPR may be used as one of the ALU inputs. In addition, SPR may provide various counting and shifting operations which can be applied to it concurrently with other operations of DP. This allows temporary data values such as loop counters to be stored in SPR, with loop control functions (such as decrementing and testing for zero) performed concurrently with the loop body. The operations applied to the contents of SPR during each clock cycle are determined by the applicable microinstruction. SPR may also be used for a variety of other functions. For example, it may supply new microinstruction addresses to PC (FIG. 9) when high-level branching operations occur, and it may also supply a value to SLC (FIG. 11) which can be used for low-level dynamic branching.

The Special Purpose Registers SPR may typically comprise three separate register files, one for use in each of the three Read, Compute and Write operations (stages 1, 2, and 3, respectively) occurring during a clock cycle. The Stage 1 SPR Register File may contain, for example, 16 register locations, each register being keyed to a task number. The Program Controller PC (FIG. 9), when decoding an OP, will also decode the parameters from the program word. These parameters are written into the Stage 1 SPR Register File by TC (FIG. 10) when the task is initiated. Data may also be written into the Stage 1 SPR Register File from the SPR files of other stages.

When a Ready Task is selected from the Task Controller TC (FIG. 10), its task number is used to index into the Stage 1 SPR Register File in order to read its parameters or data (if any). During Stage 1 (Read operation), SPR data is routed to the Address and State Unit ASU (FIGS. 3 and 15) for register addressing, to SLC (FIG. 11) for dynamic addressing for the G/H Rotate and Mask stores of ACM, and also for dynamic branching. During Stage 2 (Computer operation), SPR data is applied as input to ALU of DP (FIG. 14) and to SLC (FIG. 11) for dynamic N-mask addressing.

The Stage 3 SPR has internal rotate, count, and shift capabilities. These are used to process the data kept in SPR. This processing is controlled by SLC. Stage 3 SPR data is routed during a Write operation (Stage 3) to PC (FIG. 9) for use as pseudo-OPs and for setting PWI and PSI, and is also routed to the Stage 1 SPR. Also available from the Stage 3 SPR are certain late conditions which are generated after the SPR Stage 3 operation has been completed, and are routed to SLC for use as branch conditions in the next cycle.

Address and State Unit ASU (FIG. 15)

A primary purpose of the Address and State Unit ASU is to calculate and check addresses and to store these addresses along with other state values of the high-level architecture in an ASU register file ASU-RF. The storing into ASU-RF is controlled through an ASU Change Queue ASU-CQ to insure proper updating and sequencing. ASU also includes an ASU Arithmetic Logic Unit ASU-ALU for performing address calculations, a Limit Checker LC for making address calculation limit checks, and an Address Decoupler AD for performing decoupling functions. Typical types of address computations performed by ASU are as follows:

1. Address computations from "address couples".
2. Address computations of the form "base+offset", where the base address is a piece of state stored in ASU and the offset is either a small literal value or a value provided by DP (FIG. 14).
3. Address computations of the form "base+offset", where the base address and offset are provided by DP.
4. Address computations of the form "base+offset" for PC (FIG. 9), where the base address is a piece of state stored in ASU and the offset is provided by the PC.

Address Decoupler AD (FIG. 15)

The Address Decoupler AD uses SPR data from the Main Data Path DP (FIG. 14) to perform computations on address couples for providing an index value to the ASU Arithmetic Logic Unit ASU-ALU.

ASU Register File ASU-RF and ASU Change Queue ASU-CQ (FIG. 15)

The ASU Register File ASU-RF is used to hold various states and/or registers. All changes to ASU-RF are queued through the ASU Change Queue ASU-CQ. Any time a task wishes to access data in ASU-RF the state of ASU-CQ is checked. When a task reads ASU-RF, the contents of ASU-CQ are checked to find any new entries for that address that may have been written by a predecessor task. When a task wishes to update the contents of ASU-RF, the write is first queued through ASU-CQ. The address used for designating the write location is the same address as would be used in reading. In the present implementation, reads from one location and writes into another location in ASU-RF cannot be done within the same clock cycle. An address select field from SLC (FIG. 11) designates if the results of the address decouple are being used, if the ASU may be used for PC fetch, and also designates the address source for reading and updating ASU-RF.

The ASU Change Queue ASU-CQ may typically comprise a "Lock" and, for example, two slots. Each slot typically contains fields for the task number, the address of the location in ASU-RF, a base value, and a limit value. The Lock indicates the task number that has the Lock set. When the Lock is not set, this value is typically zero.

ASU Change Queue ASU-CQ (FIG. 15)—Typical Read Operation (FIG. 16)

If a task does a read, CONDITIONS within ASU-CQ are checked in the logical order set forth below causing the ACTION listed with each condition to occur. Refer also to the typical read flow for ASU-CQ illustrated in FIG. 16.

CONDITION: Predecessor task has Lock.
ACTION: Read Task put to sleep waiting on "change to ASU". SLC will generate a Present Cycle Abort (PCA).

CONDITION: Predecessor task has invalid address in address field of slot.
ACTION: Read task put to sleep waiting on "change to ASU". SLC will generate a Present Cycle Abort (PCA).

CONDITION: Predecessor task has the same address as that being read by present task, but data is invalid.
ACTION: Read task put to sleep waiting on "change to ASU". SLC will generate a Present Cycle Abort (PCA).

CONDITION: Predecessor task has same address and valid data.
ACTION: Contents read from ASU Change Queue.

CONDITION: All predecessor tasks have different addresses.
ACTION: Contents read from ASU Register File.

Note with respect to FIG. 16 and the above listing that, when both slots contain valid data for the requested address, then the latest copy is given the read task. Also note that, when a task becomes active after having been put to sleep, then the FIG. 16 flow is again checked.

ASU Change Queue ASU-CQ (FIG. 15)—Typical Unload Operation

Once a Task has reached Oldest Active Task (OAT) and the contents of the slot are marked valid (address and data), then that slot may be written into ASU-RF. When the slot contents have been successfully written into ASU-RF, the slot is made available—that is, the task number is set to zero and the validity bits for the address and data are reset. The Task Controller TC (FIG. 10) monitors the condition "OAT not in ASU-CQ". This is one of the conditions used by TC for termination of the task.

ASU Change Queue ASU-CQ (FIG. 15)—Typical Write Operation

If a task is to write new values into ASU-RF then, at the initiation of that task by PC (FIG. 9), the ASU Lock is set with that task number. A task must have the Lock in order to acquire an ASU Change Queue slot. If the Lock is already set by a preceding task, then PC is stopped until the Lock is unlocked. The Lock can then be set for this next task and PC started. When a task requests a slot, ASU will verify that a slot is available. If a slot is not available, that task is put to sleep waiting on a "change to ASU". When the slot is acquired, the task number is written into the slot. The address and data components may be supplied independently or together, at any time. The value component is obtained from ASU-ALU and LC. Writing into the ASU Change Queue is performed during the Write operation of each clock cycle (Stage 3). If a Present Cycle Abort (PCA) condition occurs, the writing is inhibited. A "Change to ASU" is caused by unloading of a slot, making the address and data in ASU-CQ valid, and unlocking of the ASU-CQ.

ASU Arithmetic Logic Unit ASU-ALU (FIG. 15)

ASU-ALU performs simple arithmetic and logical operations on two operands applied thereto. These two operands, designated the "base" and the "index", are usually, but not always, memory addresses. The base input can come from ASU-RF or from ASU-CQ, and also from DRF of DP (FIG. 14). The index input can come from AD, DRF of DP, or from PC (FIG. 9). The output of ASU-ALU is provided to the Limit Checker LC, to the Memory System MS (FIG. 2) (as a memory address), and to DP (to be written into SPR or DRF). The output of ASU-ALU can also be written into the base portion of a word in ASU-RF via ASU-CQ.

Limit Checker LC (FIG. 15)

The Limit Checker LC performs address comparison, provides branch conditions to SLC (FIG. 11) based on this comparison, and can optionally cancel a memory request based on the comparison. One of the two inputs to the Limit Checker LC is from ASU-ALU. The other input comes from the limit portion of the word which supplied the base input to ASU-ALU.

Memory System MS (FIGS. 2 and 17)

With reference to FIG. 17, the Memory System MS (illustrated in block form in FIG. 2) may typically comprise the following: a plurality of Memory Modules MM; a Memory Exchange MEX serving as an expansion module to interface to MM and GM; and a Memory Control MC (including a Cache Memory CHM and a Memory Change Queue MCQ) serving as an interface to MM and the Global Memory GM (FIG. 1) from the Processing Element PE (FIG. 3).

The Cache Memory CHM is typically a very high-speed memory which contains redundant copies of recently accessed blocks of words in MM. Memory read requests are satisfied by reading words from CHM if the appropriate block is present therein, thus avoiding the greater time required for an MM access. However, if the appropriate block is not present in CHM, it is fetched from MM and replaces some other block in CHM. Memory write operations are always written to MM and are also written to CHM if the appropriate block is present. Thus, CHM data is always identical to MM data, and no updating of MM is necessary when a CHM block is replaced.

The Memory Change Queue MCQ is used to queue changes to MM in a basically similar manner to that described previously for ASU-CQ (FIG. 15). The Memory Change Queue MCQ is used for accessing operations with respect to both MM and the Global Memory GM.

A task (other than the HDP task) makes a request for a memory write operation by entering a complete entry into the Memory Change Queue MCQ. As described previously with regard to the ASU-CQ, a requesting task is required to own the change queue lock in order to gain entry to MCQ, this lock being acquired for the requesting task by the Program Controller PC (FIG. 9) before task initiation. The information for entry to MCQ may be supplied at the same time that the entry is placed in MCQ, or may be supplied at a later time. After entry has been completed, MS will initiate operation for a requesting task when the task has reached the top of MCQ and has become the Oldest Active Task (OAT).

A task makes a read memory request by supplying the memory address obtained from the output of the ASU Arithmetic and Logic Unit ASU-ALU (FIG. 15) along with the converted address obtained from the Register Mapper RMAP of DP (FIG. 14). The task may then continue processing if it has something else to do while the addressed data is being accessed from memory. If not, the task is put into a Waiting state. Each requesting task also involves a Memory Action Complete (MAC) condition. This condition is cleared at the beginning of every memory request by that task and is set by the memory subsystem when the request has been satisfied. This signals the Task Controller TC (FIG. 10) to return the task to Ready status if it has been in a Waiting State because of this condition.

Figure 18:
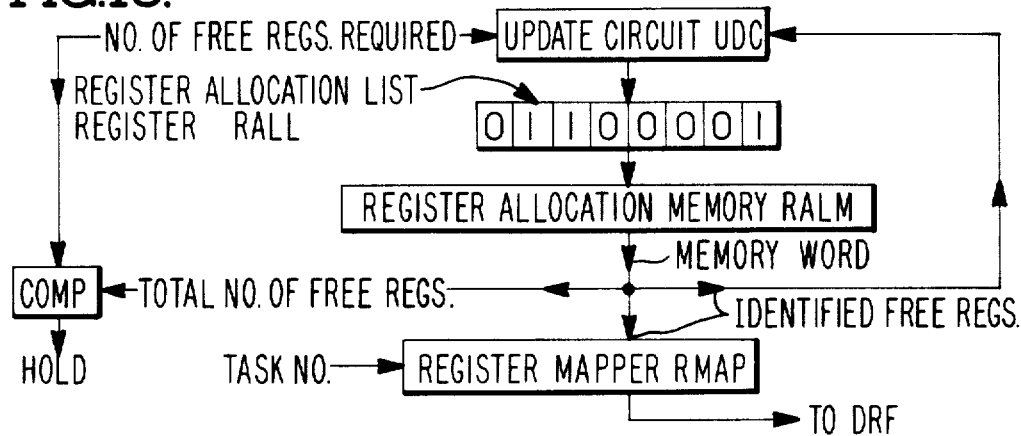
FIG. 18 is a block diagram illustrating a specific manner of providing for register allocation by the Task Controller.
Figure 19:
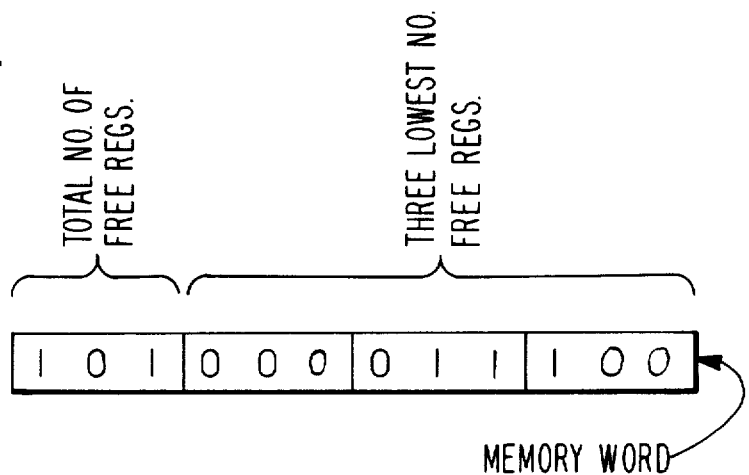
FIG. 19 illustrates the nature of a word read out from the Register Allocation Memory RALM in FIG. 18.

Register Allocation—A More Detailed Description (FIGS. 18 and 19)

Next to be presented is a more detailed description of the manner in which register allocation can be provided in the embodiment of the invention described above.

It will be remembered that the Task Controller TC (FIGS. 3 and 10), in response to task setup data provided by the Program Controller PC (FIGS. 3 and 9), provides for allocating registers in the Data Register File DRF of the Main Data Path DP (FIGS. 3 and 14) as required for each task. As will be evident from the example of register allocation summarized in FIG. 5, a task normally requires one or more output and temporary registers and may also require one or more input registers. These registers are located in the Data Register File DRF (FIG. 14) which, as described previously, includes the Top-of-Stack TOS. Registers designated as input registers will previously have been assigned by the register allocation mechanism and placed in TOS. Thus, if one or more input registers are indicated as being required for a newly initiated task they will normally be readily available in TOS for reassignment to the new task.

The assignment of output and temporary registers for each new task requires a determination of the particular free registers which are to be assigned to each new task. Of course, as explained previously, if there are not enough free registers available to satisfy the output and temporary register requirements of a new task, or if the required input registers are not in TOS, or if the required input registers are in TOS but not all have valid data stored therein, the task will be made to wait until these requirements are met.

A preferred manner for assigning the registers required for each new task is illustrated in FIG. 18. As shown, the Register Allocation File RALF (FIG. 10) of the Task Controller TC includes a Register Allocation List Register RALL which serves as an address register for a Register Allocation Memory RALM. RALL comprises a plurality of bit storage elements whose "0" or "1" values indicate the register use status of the registers in the Data Register File DRF (FIG. 14). For the purposes of this example, it will be assumed that there are eight assignable registers in DRF. Additional registers may be accommodated in a like manner. Accordingly, for this example, RALL in FIG. 18 will be assumed to contain eight bit storage elements respectively corresponding to the eight registers in DRF. For illustrative purposes it will be assumed that the eight registers in DRF are numbered 0-7 and that the bit storage elements have "1" and "0" values chosen so that a "1" value indicates that the corresponding register in DRF is unavailable for assignment, while a "0" value indicates that the corresponding register in DRF is free and available for assignment. It will further be assumed for this example that the eight RALL bit elements 0-7 have the particular "1" and "0" values 01100001, respectively, shown in FIG. 18. Accordingly, the free DRF registers indicated by RALL are the five registers 0, 3, 4, 5 and 6, each of which has a "0" value.

It will further be assumed for this example that each task requires the assignment of no more than three registers for use as output and temporary registers. Accordingly, the values of the elements of RALL are used as an 8-bit address to the Register Allocation Memory RALM which is mapped so that the 8-bit RALL address selects a corresponding memory word identifying the three lowest numbered free registers available in DRF (FIG. 14), as well as the total number of free DRF registers available.

The corresponding memory word selected for the exemplary 01100001 RALL values shown in FIG. 18 is illustrated in FIG. 19. As shown, this memory word indicates, in conformance with RALL, that the number of free DRF registers available is 101 (which is "5" in decimal), and identifies the three lowest numbered free DRF registers as 000, 011 and 100 (corresponding to DRF registers "0", "3" and "4", respectively). It will be understood that there is a corresponding memory word such as illustrated in FIG. 19 for all of the possible patterns of RALL values. Thus, for each pattern of RALL values, RALM provides outputs indicating the total number of free registers available, and the identifications of the three lowest numbered free DRF registers. As indicated in FIG. 18, the RALM output indicating the total number of free DRF registers is applied to a Comparator COMP which also receives an input indicating the number of output and temporary registers required to be assigned for the task to be initiated, a maximum of three being assumed for this example. If there are insufficient free DRF registers available, COMP produces a HOLD signal which is used to prevent assignment of any DRF free registers and to cause initiation of the task to wait until there are sufficient DRF registers available for assignment.

If there are sufficient free DRF registers available for assignment, the identified DRF register numbers outputted from RALM in FIG. 18 are applied to the Register Mapper RMAP (see also FIG. 14) along with the task number and the Top-of-Stack register numbers (from TC) of the input registers (if any) to be assigned to the task. These register identification numbers and their corresponding task number are stored in RMAP so that, when RMAP is subsequently addressed by the task number during task execution, these assigned register numbers are read out from RMAP for use in accessing the corresponding registers in the Data Register File DRF (FIG. 14) for use in performing the task.

It will additionally be seen in FIG. 18 that the lowest free DRF register numbers read out from RALM are also applied to an Update Circuit UPC along with the number of free registers required for the task whereupon UPC responds to these inputs to correspondingly update the values of RALL to represent the current free register status of DRF.

Although the description of the invention provided herein has been primarily directed to particular illustrative embodiments in order to clearly demonstrate the basic principles of the invention and the manner in which it may be readily practiced so as to take advantage of the stated features and advantages, it is to be understood that many modifications and variations in structure, arrangement, components, operation and use are possible within the contemplated scope of the invention without departing from the spirit of the invention. The appended claims are accordingly intended to cover and embrace all such possible modifications and variations within the true spirit and scope of the invention.

We claim:

1. In a microprogrammed data processing system including high level instruction storage means, the combination comprising:
    task generation means for fetching high level instructions from said high level instruction storage means and in response thereto generating one or more tasks for performing each high level instruction, each task being in turn performable by the execution of one or more task microinstructions;
    microinstruction storage means for storing selectably addressable task microinstructions for use in performing said tasks;
    said task generating means being operative to access selected microinstructions from said microinstruction storage means;
    microinstruction execution means for receiving and executing microinstructions selected from said microinstruction storage means by said task generating means; and
    task control means responsive to said task generation means and to said microinstruction execution means for determining which tasks are ready for execution and for causing said task generation means to address said microinstruction storage means with addresses corresponding to ready task microinstructions, the order of addressing of microinstructions being chosen to allow for the execution of ready task microinstructions by said microinstruction execution means in an intermixed order regardless of the particular task to which each belongs so as to thereby provide for task multiprogramming at a microinstruction level; and
    a plurality of dynamically allocatable registers for storing data required during execution of said tasks;
    said task control means including register allocation means for monitoring the free and use states of said registers and in response thereto for dynamically assigning the registers required by each task during execution thereof.

2. The invention in accordance with claim 1, wherein said register allocation means includes:
    a register allocation list register having a plurality of bit storage elements whose values indicate the free and use states of said dynamically allocatable registers;
    a register allocation memory addressed by said register allocation list register, said register allocation memory being mapped so that the address provided by said register allocation list register selects a corresponding memory word in said memory which individually identifies each of a particular number of free registers currently available for assignment; and
    register mapper storing means responsive to memory words read from said memory for storing free register assignments for each initiated task so as to provide for accessing appropriate ones of said registers during execution of each task.

3. The invention in accordance with claim 2, wherein each selected memory word also provides a total free register indication of the total number of free registers currently available, and wherein said register allocation means also includes means responsive to this total free register indication for preventing register assignment and task initiation of a new task when there are insufficient free registers currently available to meet the register assignment needs of the task.

4. The invention in accordance with claim 2 or 3, wherein said register allocation means additionally includes means responsive to each selected memory word for updating said register allocation list register.

5. The invention in accordance with claim 1, 2, or 3, wherein a plurality of said registers are capable of serving as stack registers including a plurality of floating top-of-stack registers, wherein said microinstruction execution means provides for communication between microinstructions via said top-of-stack registers, and wherein said register allocation means of said task control means is operative to dynamically assign registers required for a task to particular ones of the stack registers when the task is brought into said mix.

6. The invention in accordance with claim 1, 2 or 3, wherein said task control means provides a predetermined group of tasks which are currently ready for execution, said task control means being operative to insert into said group one or more additional ready tasks from said task generation means so long as sufficient free registers are available to meet task requirements.

7. The invention in accordance with claim 1, 2 or 3, wherein said system is constructed and arranged to permit operations of said task generation means, said task control means and said microinstruction execution means to occur concurrently so that, while a current microinstruction is being executed by said microinstruction execution means, said task generation means and said task control means are able to perform operations on later following microinstructions.

8. The invention in accordance with claim 7, wherein the operations of said microinstruction sequencing means occur concurrently with the operations of said microinstruction execution means so that the next microinstruction to be executed is determined while a current microinstruction is being executed.

9. The invention in accordance with claim 8, wherein said system includes means defining clock periods, wherein said microinstruction execution means is capable of executing a different task microinstruction during each clock period, wherein said task control means is capable of providing a new microinstruction address to said microinstruction storage means during each clock period, and wherein said microinstruction sequencing means is capable of determining a next microinstruction address during each clock period.

10. In a microprogrammed data processing system including high level instruction storage means and microinstruction execution means, an improved method for performing high level instructions by executing microinstructions corresponding thereto, said method comprising the steps of:
- fetching a high level instruction to be performed from said high level instruction storage means;
- generating one or more tasks corresponding to each high level instruction, each task being performable by executing one or more microinstructions;
- determining from the generated tasks a group of tasks which are ready for execution;
- determining register assignments for each ready task;
- monitoring the free and use states of said registers;
- dynamically assigning registers for each task in response to said monitoring; and
- deriving and executing task microinstructions corresponding to ready tasks in said group in an intermixed sequence regardless of the particular tasks to which each microinstruction corresponds so as to thereby provide for task multiprogramming on a microinstruction level, said intermixed sequence being determined in response to the results of microinstruction execution and the ready tasks in said group.

* * * * *

UNITED STATES PATENT AND TRADEMARK OFFICE
CERTIFICATE OF CORRECTION

PATENT NO. : 4,493,020
DATED : January 8, 1985
INVENTOR(S) : Dongsung R. Kim and John H. McClintock, Jr.

It is certified that error appears in the above-identified patent and that said Letters Patent is hereby corrected as shown below:

Col. 9, line 27, change "(A + B)" to --(1 + C)--.
Col. 19, line 30, change "[A $>$ B AND (OAT $\leq$ A OR OAT $>$ B)]"
to --[A $<$ B AND ( OAT $<$ = A OR OAT $>$ B )]--;
line 33, change "[A $>$ B AND (OAT $\leq$ A AND OAT $>$ B)]"
to --[A $<$ B AND ( OAT $<$ = A AND OAT $>$ B )]--.
Col. 20, line 14, change "(HDP FIG. 2)" to --HDP (FIG. 2)--.

Signed and Sealed this

Twenty-fifth Day of June 1985

[SEAL]

Attest:

DONALD J. QUIGG

Attesting Officer  Acting Commissioner of Patents and Trademarks